United States Patent
Caprioli et al.

(10) Patent No.: US 10,540,536 B2
(45) Date of Patent: Jan. 21, 2020

(54) SYSTEM FOR INTERPRETATION OF IMAGE PATTERNS IN TERMS OF ANATOMICAL OR CURATED PATTERNS

(71) Applicants: Katholieke Universiteit Leuven, K.U.Leuven R&D, Leuven (BE); Vanderbilt University, Nashville, TN (US)

(72) Inventors: Richard M. Caprioli, Brentwood, TN (US); Bart De Moor, Bierbeek (BE); Raf Van De Plas, Molenbeek-Wersbeek (BE); Nico Verbeeck, Tremelo (BE); Etienne Waelkens, Rotselaar (BE)

(73) Assignees: Katholieke Universiteit Leuven, K.U.Leuven R&D, Leuven (BE); Vanderbilt University, Nashville, TN (US)

(*) Notice: Subject to any disclaimer, the term of this patent is extended or adjusted under 35 U.S.C. 154(b) by 153 days.

(21) Appl. No.: 15/500,998

(22) PCT Filed: Aug. 3, 2015

(86) PCT No.: PCT/BE2015/000034
§ 371 (c)(1),
(2) Date: Feb. 1, 2017

(87) PCT Pub. No.: WO2016/015108
PCT Pub. Date: Feb. 4, 2016

(65) Prior Publication Data
US 2017/0220850 A1    Aug. 3, 2017

Related U.S. Application Data

(60) Provisional application No. 62/031,965, filed on Aug. 1, 2014.

(51) Int. Cl.
*G06K 9/00* (2006.01)
*H01J 49/00* (2006.01)
(Continued)

(52) U.S. Cl.
CPC ....... *G06K 9/00147* (2013.01); *G06K 9/2054* (2013.01); *G06K 9/6218* (2013.01);
(Continued)

(58) Field of Classification Search
CPC ............. G06K 9/00147; G06K 9/2054; G06K 9/6218; G06T 2207/10072;
(Continued)

(56) References Cited

U.S. PATENT DOCUMENTS

| 500,148 A | 6/1893 | Moore |
| 4,820,648 A | 4/1989 | Caprioli et al. |

(Continued)

FOREIGN PATENT DOCUMENTS

WO    2016015108 A    2/2016

OTHER PUBLICATIONS

Abdelmoula et al., Automatic Registration of Mass Spectrometry Imaging Data Sets to the Allen Brain Atlas, Analytical Chemistry, vol. 86, No. 8, Apr. 15, 2014, pp. 3947-3954.
(Continued)

*Primary Examiner* — Tom Y Lu
(74) *Attorney, Agent, or Firm* — TraskBritt

(57) ABSTRACT

Imaging mass spectrometry (IMS) has become a prime tool for studying the distribution of biomolecules in tissue. Although IMS data sets can become very large, computational methods have made it practically feasible to search these experiments for relevant findings. However, these methods lack access to an important source of information that many human interpretations rely upon: anatomical insight. In this work, this need is addressed by (1) integrating
(Continued)

a curated anatomical data source with an empirically acquired IMS data source, establishing an algorithm-accessible link between them; and (2) demonstrating the potential of such an IMS-anatomical atlas link by applying it toward automated anatomical interpretation of ion distributions in tissue.

20 Claims, 21 Drawing Sheets

(51) Int. Cl.
    *G06K 9/20*     (2006.01)
    *G06K 9/62*     (2006.01)
    *G06T 7/00*     (2017.01)

(52) U.S. Cl.
    CPC ........ *G06T 7/0012* (2013.01); *H01J 49/0004* (2013.01); *G06T 2207/10081* (2013.01); *G06T 2207/10116* (2013.01); *G06T 2207/10132* (2013.01); *G06T 2207/30048* (2013.01)

(58) Field of Classification Search
    CPC . G06T 2207/10081; G06T 2207/10104; G06T 2207/10116; G06T 2207/10128; G06T 2207/10132; G06T 2207/30048; G06T 7/0012; G06T 7/11; G06T 7/143; H01J 49/0004
    See application file for complete search history.

(56) References Cited

U.S. PATENT DOCUMENTS

| | | | |
|---|---|---|---|
| 4,908,512 | A | 3/1990 | Caprioli et al. |
| 5,078,135 | A | 1/1992 | Caprioli et al. |
| 5,808,300 | A | 9/1998 | Caprioli |
| 6,458,597 | B1 | 10/2002 | Andrien, Jr. et al. |
| 6,707,038 | B2 | 3/2004 | Ellson et al. |
| 6,756,586 | B2 | 6/2004 | Caprioli |
| 6,809,315 | B2 | 10/2004 | Ellson et al. |
| 6,855,925 | B2 | 2/2005 | Ellson et al. |
| 6,858,437 | B2 | 2/2005 | Andrien, Jr. et al. |
| 7,074,936 | B2 | 7/2006 | Caprioli et al. |
| 7,364,913 | B2 | 4/2008 | Andrien, Jr. et al. |
| 7,491,187 | B2 | 2/2009 | Van Den Berghe et al. |
| 7,534,338 | B2 | 5/2009 | Hafeman et al. |
| 7,569,392 | B2 | 8/2009 | Levy et al. |
| 7,799,519 | B2 | 9/2010 | Caprioli |
| 7,824,920 | B2 | 11/2010 | Agnes et al. |
| 7,829,291 | B2 | 11/2010 | Caprioli |
| 7,858,388 | B2 | 12/2010 | Porter et al. |
| 8,304,196 | B2 | 11/2012 | Caprioli |
| 8,697,447 | B2 | 4/2014 | Caprioli et al. |
| 8,778,695 | B2 | 7/2014 | Caprioli |
| 8,822,159 | B2 | 9/2014 | Caprioli et al. |
| 9,261,438 | B2 | 2/2016 | Ferguson et al. |
| 9,328,031 | B2 | 5/2016 | Ledoux et al. |
| 9,501,687 | B2 | 11/2016 | Caprioli et al. |
| 2002/0195558 | A1 | 12/2002 | Ellson et al. |
| 2003/0073145 | A1 | 4/2003 | Caprioli |
| 2004/0026615 | A1 | 2/2004 | Ellson et al. |
| 2004/0152913 | A1 | 8/2004 | Caprioli et al. |
| 2005/0029444 | A1 | 2/2005 | Caprioli |
| 2005/0116161 | A1 | 6/2005 | Hafeman et al. |
| 2005/0121537 | A1 | 6/2005 | Ellson et al. |
| 2005/0171503 | A1 | 8/2005 | Van Den Berghe et al. |
| 2006/0219558 | A1 | 10/2006 | Hafeman et al. |
| 2006/0223122 | A1 | 10/2006 | Fogo |
| 2006/0240562 | A1 | 10/2006 | Caprioli et al. |
| 2006/0246480 | A1 | 11/2006 | Caprioli |
| 2006/0292607 | A1 | 12/2006 | Caprioli |
| 2007/0031900 | A1 | 2/2007 | Caprioli |
| 2007/0249056 | A1 | 10/2007 | Porter et al. |
| 2008/0113875 | A1 | 5/2008 | Chaurand et al. |
| 2008/0195062 | A1 | 8/2008 | Caprioli |
| 2009/0071834 | A1 | 3/2009 | Hafeman et al. |
| 2010/0133098 | A1 | 6/2010 | Hafeman et al. |
| 2011/0065130 | A1 | 3/2011 | Caprioli |
| 2011/0190145 | A1 | 8/2011 | Caprioli |
| 2011/0217783 | A1 | 9/2011 | Caprioli et al. |
| 2012/0021189 | A1 | 1/2012 | Laibinis et al. |
| 2012/0053083 | A1 | 3/2012 | Daemen et al. |
| 2012/0295276 | A1* | 11/2012 | Cooks .................... G01N 33/92 435/7.1 |
| 2013/0035867 | A1 | 2/2013 | De Moor et al. |
| 2013/0080072 | A1* | 3/2013 | Ikegami ............ G06K 9/00134 702/23 |
| 2013/0273560 | A1* | 10/2013 | Cooks .................... G01N 27/62 435/7.1 |
| 2014/0044673 | A1 | 2/2014 | Caprioli et al. |
| 2014/0357526 | A1 | 12/2014 | Caprioli et al. |
| 2015/0131888 | A1 | 5/2015 | Caprioli et al. |
| 2015/0218058 | A1 | 8/2015 | Ledoux et al. |
| 2016/0126073 | A1 | 5/2016 | Norris et al. |

OTHER PUBLICATIONS

Chen et al., Mixture of Segmenters with Discrimitive Spatial Regularization and Sparse Weight Selection, Sep. 18, 2011, pp. 595-602.
PCT International Search Report, PCT/BE2015/000034, dated dated Aug. 3, 2015.
PCT International Search Report and Written Opinion, PCT/BE2015/000034, dated Aug. 3, 2015.
Verbeeck et al., Datamining of Imaging Mass Spectrometry Imaging Data Sets to the Allen Brain Atlas, Analytical Chemistry, vol. 86 No. 8, Apr. 15, 2014 pp. 3947-3954.
Verbeek et al., Automated Anatomical Interpretation of Ion Distributions in Tissue Linking Imaging Mass Spectrometry to Curated Atlases, Analytical Chemistry, vol. 86 No. 18, Dec. 1, 2014, pp. 1-17.

* cited by examiner

Input: Anatomical structure image of caudoputamen

*Anatomical query: Which ions are specific to the caudoputamen?*
Correlation table
Anatomical structures m/z values

Output: Correlating ion images m/z 12650          m/z 21832
ρ = 0.77           ρ = 0.70

Input: Ion image m/z 7841

Ion query: In which anatomical regions is m/z 7841 located?

Correlation table

Anatomical structures m/z values

Output: Correlating anatomical structures

Somatosensory areas
$\rho = 0.36$

Isocortex
$\rho = 0.40$

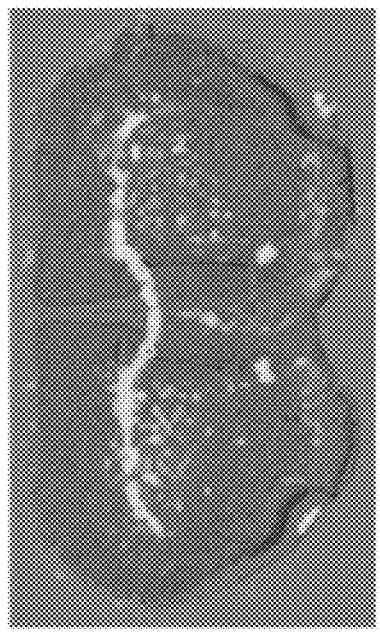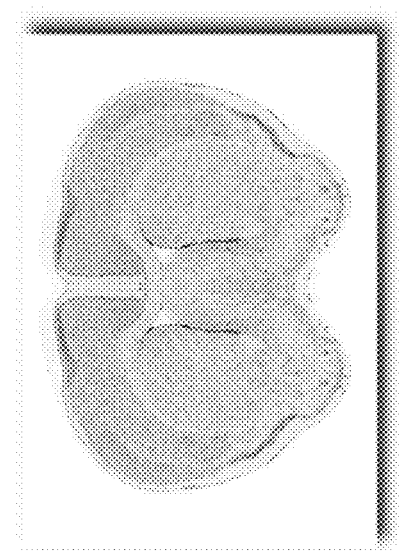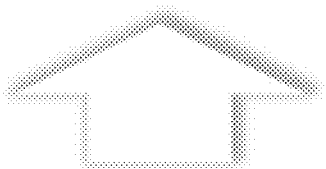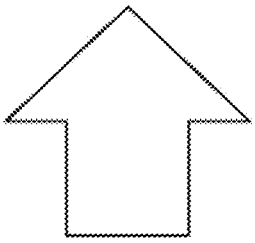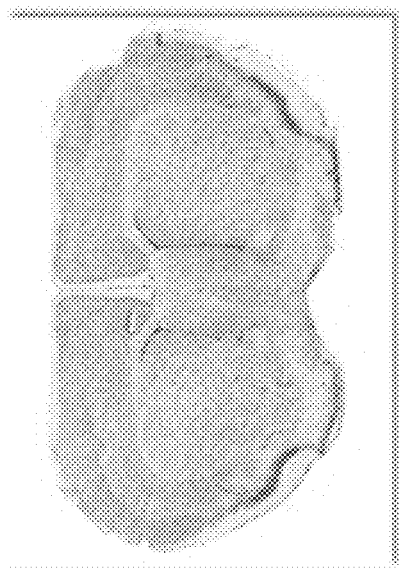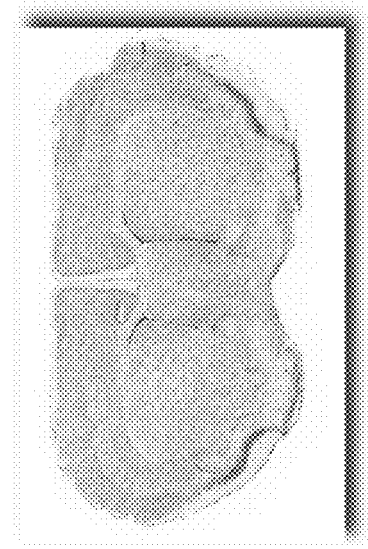
FIG. 6
FIG. 7

Reference Histology m/z 14530 registered to Reference Histology

Experiment Histology registered to Reference Histology m/z 18411 registered to Reference Histology

*Ion query: In which anatomical regions is m/z 7841 located?*

Input: Ion image m/z 7841

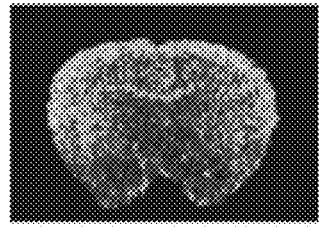

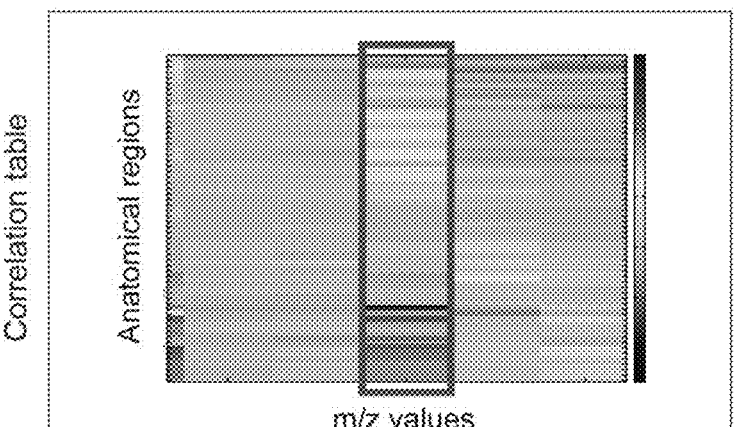

Output: Correlating anatomical structures

| Positive Correlation Examples | No Correlation Examples | Negative Correlation Examples |
|---|---|---|
| Somatosensory Areas $\rho = 0.36$ 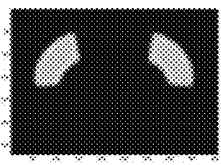 | Claustrum $\rho = -0.01$ 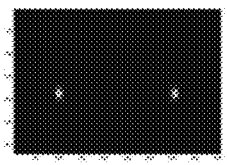 | Striatum ventral region $\rho = -0.23$ 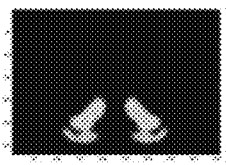 |
| Isocortex $\rho = 0.40$ 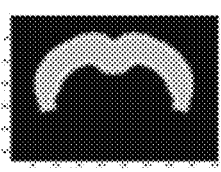 | Anterior cingulate area, dorsal part $\rho = 0.02$ 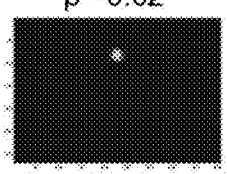 | Cerebral Nuclei $\rho = -0.29$ 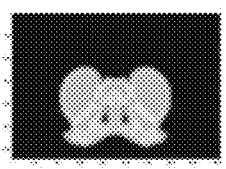 |

FIG. 11B

SYSTEM FOR INTERPRETATION OF IMAGE PATTERNS IN TERMS OF ANATOMICAL OR CURATED PATTERNS

CROSS-REFERENCE TO RELATED APPLICATIONS

This application is a national phase entry under 35 U.S.C. § 371 of International Patent Application PCT/BE2015/000034, filed Aug. 3, 2015, designating the United States of America and published in English as International Patent Publication WO 2016/015108 A1 on Feb. 4, 2016, which claims the benefit under Article 8 of the Patent Cooperation Treaty to U.S. Provisional Patent Application Ser. No. 62/031,965, filed Aug. 1, 2014.

TECHNICAL FIELD

This application relates generally to a system or a method for automated interpretation of images in a computer-readable environment and 1) generates an image to interpret by a technique that images the spatial distribution of a particular property of a sample of a molecular or chemical composition, 2) links a body of curated patterns or a set of reference image patterns to interpret the image, and 3) spatially maps the body of curated patterns or the reference image patterns to the image to interpret, wherein the method further delivers a decomposition or approximation of the image pattern to interpret or it generally relates to a system or method for automated interpretation of images in a computer-readable environment and 1) generates an image to interpret by a technique that images the spatial distribution of a particular property species of a sample of a molecular or chemical composition, 2) links a body of curated patterns or a set of reference image patterns with which to interpret the image, and 3) spatially maps the body of curated patterns or the reference image patterns to the image to interpret, wherein the method further delivers a decomposition of the image to interpret into a combination of the body of curated patterns or reference image patterns and their corresponding expression intensities in the image to interpret. More particularly, this disclosure, in particular embodiments, relates to a system for an automated interpretation of the distribution of physicochemical species of a molecular or chemical composition using anatomical or curated patterns, for instance, the automated anatomical interpretation of distributions in tissue from an imaging data set or multiple data sets, for instance, imaging data sets of imaging mass spectrometry (IMS), Mill, CT, PET or microscopy measurements whereby the physicochemical distributions are translated in terms of the curated patterns in an anatomical atlas, after first establishing a link between the image data and an anatomical atlas enabling an automated anatomical annotation.

More particularly, this disclosure relates to a system and method for automated anatomical interpretation of ion distributions in tissue or other physicochemical property species distributions in a molecular or chemical composition by imaging mass spectrometry of the tissue and consequently linking such to curated atlases by spatially mapping the anatomical atlas to the IMS data sets and, furthermore, by providing automated anatomical interpretation of ion images or property species images whereby the ion distributions or property species distributions are deconstructed as combinations of known anatomical structures.

The disclosure also relates to a system and method for automated anatomical interpretation of ion distributions in tissue generated from imaging mass spectrometry by (1) integrating a curated anatomical data source with an empirically acquired IMS data source, establishing an algorithm-accessible link between them, and (2) demonstrating the potential of such an IMS-anatomical atlas link by applying it toward automated anatomical interpretation of ion distributions in tissue.

BACKGROUND

Understanding the spatial context in which molecular interactions take place is becoming increasingly important in the study of biological and pathological processes in living organisms. The spatial distribution of biomolecules and the localization of biochemical interactions throughout tissue often hold crucial clues toward determining the biological functions of these biomolecules. Imaging mass spectrometry, IMS (R. M. Caprioli, T. B. Farmer, and J. Gile, *Anal. Chem.* 1997, 69:4751-4760, and L. A. McDonnell, and R. M. A. Heeren, *Mass Spectrom. Rev.* 2007, 26:606-643) is a molecular imaging technology that can deliver such spatial information with high chemical specificity for various classes of biomolecules, including metabolites, lipids, peptides, and proteins.

IMS has been gaining considerable momentum in recent years, primarily in the field of tissue biomarkers (K. Chughtai and R. M. A. Heeren, *Chem. Rev.* 2010, 110:3237-3277, and A. Walch, S. Rauser, S.-O. Deininger, and H. Höfler, *Histochem. Cell Biol.* 2008, 130:421-434) and drug delivery (N. Takai, Y. Tanaka, K. Inazawa, and H. Saji, *Rapid Commun. Mass Spectrom.* 2012, 26:1549-1556, and P. J. Trim, C. M. Henson, J. L. Avery, A. McEwen, M. F. Snel, E. Claude, P. S. Marshall, A. West, A. P. Princivalle, and M. R. Clench, *Anal. Chem.* 2008, 80:8628-8634), and has been successfully applied to tissues of various origin, including insect (Y. Sugiura, Y. Konishi, N. Zaima, S. Kajihara, H. Nakanishi, R. Taguchi, and M. Setou, *J. Lipid Res.* 2009, 50:1776-1788), mammalian (M. Stoeckli, P. Chaurand, D. E. Hallahan, and R. M. Caprioli, *Nat. Med.* 2001, 7:493-496), and human tissue (S. Khatib-Shahidi, M. Andersson, J. L. Herman, T. A. Gillespie, and R. M. Caprioli, *Anal. Chem.* 2006, 78:6448-6456; L. S. Eberlin, I. Norton, A. L. Dill, A. J. Golby, K. L. Ligon, S. Santagata, R. G. Cooks, and N. Y. R. Agar, *Cancer Res.* 2012, 72:645-654; and L. H. Cazares, D. Troyer, S. Mendrinos, R. A. Lance, J. O. Nyalwidhe, H. A. Beydoun, M. A. Clements, R. R. Drake, and O. J. Semmes, *Clin. Cancer Res.* 2009, 15:5541-5551). IMS makes it possible to monitor many hundreds of biomolecules simultaneously, making it a prime technology for exploratory studies. However, this exploratory advantage is hampered by the large amount of data that a single IMS experiment can deliver, making interpretation and analysis difficult.

The state of the art uses of such information in IMS studies is largely restricted to manual comparison (K. J. Boggio, E. Obasuyi, K. Sugino, S. B. Nelson, N. R. Agar, and J. N. Agar, *Expert Rev. Proteomics* 2011, 8:591-604; S. N. Whitehead, K. H. N. Chan, S. Gangaraju, J. Slinn, J. Li, and S. T. Hou, *PLoS One* 2011, 6, e20808; and T. Alexandrov, and J. H. Kobarg, *Bioinformatics* 2011, 27:i230-8), which poses a practical challenge for larger multi-experiment studies and brings with it a risk of introducing human bias into the analysis. Both supervised and unsupervised computational methods (E. A. Jones, S.-O. Deininger, P. C. W. Hogendoorn, A. M. Deelder, and L. A. McDonnell, *J. Proteomics* 2012, 75:4962-4989; J. Bruand, T. Alexandrov, S. Sistla, M. Wisztorski, C. Meriaux, M. Becker, M. Salzet, I. Fournier, E. Macagno, and V. Bafna, *J. Proteome Res.* 2011, 10:4734-4743; and J. M. Fonville, C. L. Carter, L. Pizarro, R. T. Steven, A. D. Palmer, R. L. Griffiths, P. F. Lalor, J. C. Lindon, J. K. Nicholson, E. Holmes, and J. Bunch, *Anal. Chem.* 2013, 85:1415-1423; and T. Alexandrov, *BMC Bioinformatics* 2012, 13 Suppl. 1, S11) such as hierarchical clustering, principal component analysis (R. Van de Plas, F. Ojeda, M. Dewil, L. Van Den Bosch, B. De Moor, and E. Waelkens, in *Proceedings of the Pacific Symposium on Biocomputing (PSB)*, Maui, Hi., 2007; pp. 458-469; and G. McCombie, D. Staab, M. Stoeckli, and R. Knochenmuss, *Anal. Chem.* 2005, 77:6118-6124) and probabilistic latent semantic analysis (M. Hanselmann, M. Kirchner, B. Y. Renard, E. R. Amstalden, K. Glunde, R. M. A. Heeren, and F. A. Hamprecht, *Anal. Chem.* 2008, 80:9649-9658) have been employed to perform comprehensive analysis of these large data sets. While these methods aid human interpretation by reducing the data size and complexity, they often operate in a blind fashion in the sense that they lack access to an important source of information that many human interpretations rely upon anatomical information on the tissue in question. This information is available in textbooks and through publically accessible anatomical atlases for various organ types and organisms. Mass spectrometry imaging data sets of mouse brains have been mapped to such as the Allen Mouse Brain Reference Atlas (W. M. Abdelmoula, R. J. Carreira, R. Shyti, B. Balluff, R. J. M. van Zeijl, E. A. Tolner, B. F. P. Lelieveldt, A. M. J. M. van den Maagdenberg, L. A. McDonnell, and J. Dijkstra, *Anal. Chem.* 2014, 86:3947-54).

In order to fully utilize this body of anatomical insight for the interpretation of ion distributions in IMS data, a further computer-traversable bridge between IMS and curated anatomical information is important.

There is a clear need in the art for cross-informing technologies and sources of information, as well as for predictive imaging modalities. This disclosure creates such predictive imaging modality by combining two distinct technologies or image data sources: imaging mass spectrometry (IMS) and anatomical annotations made on microscopy or other imaging tools. Furthermore, once automated spatial registration of IMS data to anatomical information through microscopy is carried out, an algorithmic link between curated anatomical data and empirically acquired IMS data is carried to consequently move beyond registration by applying the established IMS-anatomical atlas link toward automated anatomical interpretation of the ion images obtained through IMS.

BRIEF SUMMARY

There are new technical effects and advantages linked to this system or method of this disclosure.

The system or method of this disclosure allows both unsupervised and supervised applications. The same framework and system implementation can be used to deliver interpretations of image patterns for both unsupervised as well as supervised applications. In unsupervised applications, the interpretation provided by the system takes the place of an interpretation that would traditionally have to happen by a human expert. In supervised applications, the automated interpretation is used as a guide or cross-check for human interpretation, augmenting human performance by bringing a database of anatomical information into the analysis.

The system or method of this disclosure allows interpretation without human intervention. Regardless of whether the automated interpretation is used in a supervised or unsupervised setting, the explanation given by the system is obtained without human intervention. This has several technical advantages compared to manual interpretation, such as reduction of human bias or error. Unlike human interpretation, the interpretation provided by the system is completely transparent and mathematically verifiable. This allows for an objective performance of consistent quality across thousands of images to interpret. Also, if the interpretation is seen as non-optimal, the transparency of the decomposition provides a straightforward way of finding the reason for the interpretation being selected, and allows for direct adjustment and improvement of the expert system. Finally, the consistency of the automated interpretation makes the propagation of human errors into post-interpretation analysis steps less likely.

Another technical advantage compared to manual interpretation is increase of reproducibility. The transparency of the decompositions and the lack of subjective factors in the automated interpretation means that the reproducibility of the interpretations and the analysis steps that make use of them increases.

Yet another technical advantage compared to manual interpretation is the decrease of interpretation costs. The system provides anatomical atlas-level interpretation of imaging patterns at a considerably faster pace than human interpretation, on the one hand due to the inherent speed advantage of a CPU over a human and, on the other hand, due to the parallelization options inherent to the system. Together with the speed advantage, the sidestepping of human experts means a significant reduction in required time and human resources and, thus, a significant decrease in the economical cost of anatomical interpretation. Even if the atlas-level interpretation delivered by the system is considered more basic than the complexities of human interpretation, the marginal cost of the automated interpretation makes it a significant alternative for situations where human interpretation is not practical or simply not feasible. Besides unsupervised applications, it is also important to note that in supervised applications, the automated interpretation and its low economical cost and high reproducibility can be used as a filtering step preceding human interpretation. It could be used to get a rudimentary ordering of thousands of images, so that only the most important ones are passed on to human experts and the total cost of the analysis is reduced.

Moreover, the system or method of this disclosure unlocks the body of accumulated anatomical information: Although the spatial mapping of images to anatomical atlases has been done before, this practice is far removed from truly unlocking anatomical information for non-experts. Some efforts have been made to register and overlay image patterns with anatomy patterns and some rudimentary approaches go as far as to calculate univariate measures such as correlations between them. However, only methods of a multivariate nature that bring a form of automated interpretation will be able to bridge the gap between the vast anatomical databases and the non-anatomically annotated world non-experts operate in. The system disclosed herein does exactly that. In this disclosure, the interpretation system disclosed brings a massive collection of anatomical mouse brain information to bear on the interpretation of a single ion image without the presence of a domain-expert. The framework disclosed can form the automated bridge between the accumulated body of anatomical information that has been collected for years on the medical and biology side, and the empirically acquired observations done in other fields.

Other technical effects of machine-driven interpretation of this disclosure by making anatomical interpretation a machine-driven task, several technical advantages became apparent during operation, such as:

1. Increased speed of interpretation: The interpretation system is significantly faster than human experts in delivering atlas-level interpretations of image patterns. The speed of the interpretation is dependent on the particularities of the data sets being interpreted (e.g., number of pixels, number of images to interpret, size of anatomical database, etc.) and is a function of the computational and electronic resources that are available to it. This is also why partial or complete implementation of the interpretation system in hardware can be an option for more challenging interpretation tasks.
2. Parallelization of interpretation: The architecture of the disclosed framework has inherent parallelization capability so that multiple images can be interpreted in a single calculation step. This essentially enables the system to take the content of an anatomical database and concurrently interpret millions of images in a single method run.
3. Massive interpretation of all images rather than a select few: The parallelization, speed, and cost arguments make it possible to obtain anatomical interpretations for images that would not merit the time or expense if the interpretation would have to be done manually. This means that all usual arguments regarding economy-of-scale come into play for anatomical interpretation, but it also means that less findings will be missed because they were not immediately apparent when selective interpretation had to be applied. Thus, the system provides a better return on experiments that will be done in the future or have already been done in the past. Also, it is to be expected that the availability of massive amounts of anatomical interpretation across experiments will open up new analysis opportunities that hereto have not been explored.
4. Not inherently tied to anatomical information: The system framework and its implementation are not tied to the use of anatomical regions as their curated patterns. The system can essentially be used to give its best possible explanation for an image pattern using any user-provided database of patterns. Examples of non-anatomical curated patterns include: other imaging modalities, user-provided regions of interest, findings from other studies, etc.

Although it is possible to use the interpretations provided by the system to replace human manual interpretations, an important application area for this disclosure lies in the improvement and augmentation of human interpretation of image patterns. The following advantages are central to making augmented human interpretation significantly outperform traditional unassisted human interpretation such as:

1. Augmented human interpretation: By doing an economically cheap and fast automated anatomical interpretation of an image pattern in parallel to the interpretation by a human expert, it becomes possible to build a computer-assisted anatomical interpretation system that augments human expertise with on-the-fly suggestions based on anatomical atlases. Examples include: suggesting anatomy-supported labels for tissue sub-regions, indicating probable borders in the underlying tissue, and implying expected cell types in areas of interest. This disclosure can be an integral part to making any imaging expert system anatomy-aware.
2. Verification and corroboration of human interpretation: Besides augmentation and suggestions, the automated interpretation can also serve as a means of cross-checking human interpretations against the body of accumulated anatomical information. Regardless of whether anomalies are regarded as errors or correct assessments, the system would provide an automated way of highlighting where a human manual interpretation is following the atlas and where it deviates from the expected norm, so that appropriate attention can be brought to those areas specifically.

The availability of massive amounts of cheap and mathematically consistent anatomical annotations across experiments with the system of this disclosure will act as a significant catalyst for various forms of machine-driven analysis as well. The anatomical annotations that can be automatically obtained using this disclosure can be provided as additional clues and heuristics to any computational method or algorithm, regardless of its particular task. The goal in those cases would be to provide supplementary information that would allow the algorithm in question to make more informed decisions or to improve its performance overall. Examples in general: classification, clustering, and segmentation algorithms for imaging data can be significantly enhanced if anatomical annotations could be added to their analysis. One of the primary reasons for improvement would be that modality-specific noise that might misguide a classification algorithm if presented alone, will not have a corroborating pattern in the anatomical interpretation, which would allow the classification to ignore such variation if both types of data are presented concurrently. Examples in IMS: incorporation of anatomical information into both preprocessing methods such as normalization and high-level methods such as disease tissue grade classification. Moreover, the automated aspect enables the generation of anatomical annotations on a massive scale. The presence of such information across all images within a large-scale analysis opens up new algorithmic approaches, for example, focused on the statistics of anatomical interpretations across a large set of images. Such analyses are currently not considered, as with human manual interpretation they are rarely practical or feasible.

An advantage of the above-described methods is that it provides, without human interaction, an automated explanation of the observed property distribution in terms of anatomical regions, as known by medical professionals. For instance, in the examples of provided herein, the optimal explanation is defined to be the sparsest explanation (as defined by an $L^1$-norm) that can reasonably explain (or approximate) the property pattern. This means that the system will present the smallest number of anatomical zones possible that can explain the observed property pattern. However, depending on the biological question at hand, the system can be adjusted to deliver different types of interpretations (e.g., an interpretation that selects all possible anatomical zones that might be involved instead of only the most plausible ones) or to incorporate additional constraints (e.g., an interpretation consisting only of up-regulating zones and no down-regulating ones).

Several documents are cited throughout the text of this specification. Each of the documents herein (including any manufacturer's specifications, instructions, etc.) are hereby incorporated by reference; however, there is no admission that any document cited is indeed prior art of this disclosure.

In accordance with the purpose of the disclosure as embodied and broadly described herein, the disclosure is broadly drawn to a system that provides an automated interpretation of imaging patterns acquired from tissue or other sample types, with the interpretation being in terms of anatomy or other curated patterns.

The general framework of the system takes an image pattern to interpret, and delivers an optimal decomposition of this image pattern as a combination of curated patterns provided to the system. By delivering a decomposition (or an approximation) of the image pattern to interpret, the system essentially "explains" the image pattern using a vocabulary of curated patterns. The curated patterns are not necessarily of the same modality as the image to interpret. The system takes (i) an image pattern to interpret, (ii) a body of curated patterns to interpret the image pattern with, and (iii) a common spatial basis between the curated patterns and the image pattern. The definition of an optimal decomposition and, thus, the "best explanation," can be adjusted in accordance with the desired use-case and the data types involved. The framework described herein can handle various forms of optimality that make sense for the application at hand, and does so without requiring significant adjustment to the architecture.

A particular area in which the system can be applied toward a significant technical advantage is molecular imaging. The potential of the system is demonstrated through a non-exclusive use-case in an imaging mass spectrometry (IMS) context. In this proof-of-concept application, (i) the image to interpret is an ion image empirically acquired via IMS, and showing the spatial distribution of a particular ion species throughout an organic tissue section; (ii) the body of curated patterns is a database of curated anatomical regions within the tissue as defined in an anatomical atlas; and (iii) the common spatial basis is provided by a spatial mapping of coordinates from the anatomical atlas to the ion image or vice versa, obtained through image registration. In this application, the system delivers an optimal decomposition of the ion image into a combination of anatomical zones and their corresponding ion intensity. The system thus provides, without human interaction, an automated explanation of the observed ion distribution in terms of anatomical regions, as known by medical professionals. In the examples provided herein, the optimal explanation is defined to be the sparsest explanation (as defined by an $L^1$-norm) that can reasonably explain (or approximate) the ion pattern. This means that the system will present the smallest number of anatomical zones possible that can explain the observed ion pattern. However, depending on the biological question at hand, the system can be adjusted to deliver different types of interpretations (e.g., an interpretation that selects all possible anatomical zones that might be involved instead of only the most plausible ones) or to incorporate additional constraints (e.g., an interpretation consisting only of up-regulating zones and no down-regulating ones).

Method-wise, a proof-of-concept implementation of the system is provided in which the problem of finding a suitable decomposition of the image pattern to interpret and, thus, the problem of automated anatomical interpretation, is cast as an optimization problem. The optimization problem considers each of the ion images that needs to be interpreted as a linear combination of the set of curated anatomical patterns extracted from an atlas. In addition to approximating the ion image patterns, the user can impose regularization constraints such as sparsity onto the linear combination, ensuring that only a minimal number of anatomy patterns are used. By solving this problem mathematically for the optimal linear combination, it essentially delivers a selection of the anatomy patterns involved in the ion image, and also a measure or weight for each of the selected anatomical zones.

The proof-of-concept examples provided apply the interpretation system to ion images and use an anatomical mouse brain atlas to deliver automated anatomical interpretations of the ion distributions in the tissue. The proof-of-concept method implementation is cast as solving a convex optimization problem. Both the application and the method are described more extensively in the draft of a journal paper provided as an appendix to this disclosure.

In one aspect, the disclosure includes (a) the general framework of the interpretation system, (b) the particular implementation described, and (c) the application of the system in an imaging mass spectrometry (IMS) and molecular imaging setting.

There are several technical advances delivered by this disclosure.

An aspect of the disclosure is a system that can deliver anatomical interpretation of image patterns in an automated way, which holds strong potential for both unsupervised and supervised applications in the medical and biotechnology industry. In an unsupervised setting, the system can be used to obtain anatomical interpretations of an experimentally acquired image pattern without human intervention, thus reducing the chance of human bias skewing the analysis, increasing the reproducibility of the analysis, and reducing the cost and time of interpretation compared to manual interpretation by domain experts. The unsupervised aspect makes the body of anatomical information, currently locked into anatomical atlases, readily available to non-anatomy experts that need to acquire and analyze image patterns in an empirical modality. Additionally, due to the architecture of the system, it is possible to interpret millions of image patterns concurrently in a single calculation. This aspect not only increases the speed of interpretation of large sets of images, but also makes interpretation an option for images that hereto would not have merited the economical or time cost involved with manual interpretation. It is also important to note that the system is not inherently tied to anatomy information, and can essentially be used to give its best possible explanation for an image pattern using any user-provided database of patterns. This means that the same speed, reliability, and cost advantages over exhaustive manual interpretation can be brought to other forms of prior information or other data sources as well.

In a supervised setting, the system can form the backbone to a computer-assisted interpretation system that augments human interpretation by, for example, suggesting anatomy-supported labels for tissue sub-regions, indicating probable borders in the underlying tissue, or implying expected cell types in areas of interest. In applications where blind reliance on unsupervised interpretation is not desired or allowed, the system can provide an augmentation of human interpretation (e.g., increased accuracy) by cross-checking with the body of accumulated anatomical research supplied by anatomical atlases. In its supervised role, the system and the extensive anatomical knowledge it provides can help augmented human interpretation outperform traditional unassisted human interpretation.

Besides augmenting human interpretation, the automated interpretation system can also serve as an important catalyst for machine-driven analysis of images. The disclosed system provides a means of computationally annotating empirically acquired data with anatomical labels. This information not only has value for human consumption, but can also be used to improve other forms of computational analysis on the images being interpreted. The information provided by the interpretation system can serve as additional clues or heuristics for computational methods and algorithms, allowing them to make more informed decisions and increase their performance. Non-exclusive examples include the improvement of classification and clustering algorithms by providing additional information to these methods in the form of anatomical annotations. Examples in an IMS context entail the incorporation of anatomical information into both preprocessing methods such as normalization and high-level methods such as disease grade tissue classification. Besides enhancement of existing methods, the availability of interpretation data on a massive scale in addition to the raw imaging data can open up new types of analysis that hereto would not have been considered practical or even feasible.

The disclosure is a surprisingly efficient combination of expertise from three different research areas, namely, (a) computational analysis and machine learning, (b) analytical instrumentation, and (c) biology and medicine-oriented biochemistry and anatomy. The overall framework and its implementation toward a proof-of-concept require deep insights from all three areas to accomplish their tasks, and yield a resulting interpretation system that finds itself at the crossroads between the state-of-the-art in all three fields.

Some embodiments of the disclosure are set forth, for example, in claim format directly below:

A particular embodiment of this disclosure concerns a method for automated interpretation of images in a computer-readable environment and 1) generates an image to interpret by a technique that images the spatial distribution of a particular property of a sample of a molecular or chemical composition, 2) links a body of curated patterns or a set of reference image patterns to interpret the image, and 3) spatially maps the body of curated patterns or the reference image patterns to the image to interpret, whereby the method is further characterized in that the method delivers a decomposition or approximation of the image pattern to interpret.

Another particular embodiment of this disclosure concerns a method for automated interpretation of images in a computer-readable environment and 1) generating an image to interpret by a technique that images the spatial distribution of a particular property species of a sample of a molecular or chemical composition, 2) linking a body of curated patterns or a set of reference image patterns with which to interpret the image and 3) spatially mapping the body of curated patterns or the reference image patterns to the image to interpret, whereby the method is further characterized in that the method delivers a decomposition of the image to interpret into a combination of the body of curated patterns or reference image patterns and their corresponding expression intensities in the image to interpret.

The method according to any one of the previous embodiments above, whereby the properties are physicochemical properties.

The method according to any one of the previous embodiments above, whereby the spatial distribution of a particular property species is the spatial distribution of a composition of compounds, biomarker, metabolites, peptides or proteins.

The method according to any one of the previous embodiments above, whereby the imaging technique is imaging mass spectrometry (IMS).

The method according to any one of the previous embodiments above, whereby the image to interpret is generated using a biomedical imaging technology such as Radiography, Magnetic Resonance Imaging (MM), Nuclear medicine, Ultrasound, Elastography, Tactile imaging, Photoacoustic imaging, Thermography, Tomography, Echocardiography, Raman spectroscopy, or Functional near-infrared spectroscopy.

The method according to any one of the previous embodiments above, whereby the image pattern to interpret is generated using a microscope, for instance, a microscope of the group consisting of optical microscope, transmission electron microscope, scanning electron microscope and ultramicroscope or any of the types of scanning probe microscope.

The method according to any one of the previous embodiments, whereby the properties are the molecular mass.

The method according to any one of the previous embodiments, whereby the property species is an ion species and the image is an ion image.

The method according to any one of the previous embodiments, whereby the sample is a tissue.

The method according to any one of the previous embodiments, whereby the image pattern to interpret is described as a vector $q \in \mathbb{R}^K$ with K the number of pixels or voxels in the image pattern to interpret.

The method according to the previous embodiments, whereby each pattern m in the body of curated patterns or set of reference image patterns is represented by a vector $\phi^m \in \mathbb{R}^K$, whereby the total number of patterns in the body of curated patterns or set of reference image patterns is M.

The method according to the previous embodiment, whereby the vector q is written/represented/decomposed as a combination of any of the M pattern vectors $\phi^m$.

The method according to the previous embodiment, whereby the vector q is the weighted sum of the M pattern vectors $\phi^m$ as $q_k = \sum_{m=1}^{M} \phi_k^m p_m + \varepsilon_k$ for each $k=1, \ldots, K$ where $p_m = (p_1, \ldots, p_M) \in \mathbb{R}^M$ represents the weights and the residual $\varepsilon = (\varepsilon_1, \varepsilon_K)^T \in \mathbb{R}^K$. The weighted sum $\Sigma_{k=1}^{K} (\Sigma_{m=1}^{M} \phi_k^m p_m + \varepsilon_k)$ then represents a translation of the image pattern to interpret q as a sum of the body of curated patterns or reference image patterns.

The method according to any one of the embodiments above, whereby the weights $p_m$ are determined through solution of an optimization problem, minimizing the residual $\varepsilon$.

The method according to any one of the embodiments above, whereby the weights $p_m$ are determined through minimization of the residuals found through solution of an equation of the form $$p^* = \arg\min_{p} \sqrt{\sum_{k=1}^{K} \left( \sum_{m=1}^{M} \phi_k^m p_m - q_k \right)^2}$$

The method according to any one of the embodiments above, whereby the weights $p_m$ are determined through minimization of the residuals found through solution of an equation of the form $$p_\gamma^* = \arg\min_{p} \left[ \sqrt{\sum_{k=1}^{K} \left( \sum_{m=1}^{M} \phi_k^m p_m - q_k \right)^2} + \gamma \sum_{m=1}^{M} |p_m| \right]$$

with $\gamma$ the tuning parameter and $|p_m|$ the 1-norm of $p_m$.

The method according to any one of the embodiments above, whereby the weights $p_m$ are determined through minimization of the residuals found through solution of an equation of the form $$p_\gamma^* = \arg\min_p \left[ \sqrt{\sum_{k=1}^{K} \left( \sum_{m=1}^{M} \phi_k^m p_m - q_k \right)} + \gamma \sum_{m=1}^{M} |p_m| \right]$$

with $\gamma$ the tuning parameter and $|p_m|$ the 1-norm of $p_m$.

The method according to any one of the embodiments above, whereby the sparsity of the solution is increased or decreased through tuning of the parameter $\gamma$, thus increasing or decreasing the number of body of curated patterns or reference image patterns included in the approximation.

The method according to any one of the embodiments above, wherein the body of curated patterns or reference image patterns comprises curated biomedical patterns.

The method according to any one of the embodiments above, wherein the body of curated patterns or reference image patterns comprises anatomical regions defined in an atlas.

The method according to any one of the embodiments above, wherein the body of curated patterns or reference image patterns comprises anatomical regions defined in the Allen Mouse Brain atlas.

The method according to any one of the embodiments above, wherein the body of curated patterns or reference image patterns are represented by ones where the pattern is present and zeros elsewhere.

The method according to any one of the embodiments above, wherein the body of curated patterns or reference image patterns and image pattern to interpret are mapped implicitly by the relative positions of the patterns in the reference image patterns or body of curated patterns and image pattern to interpret.

The method according to any one of the embodiments above, wherein the body of curated patterns or reference image patterns and the image pattern to interpret are mapped explicitly through registration to a common coordinate system.

The method according to any one of the embodiments above, whereby (i) the image to interpret is an image of spatial properties distribution throughout a section of the sample that images the spatial distribution of the molecules or chemicals by one or more of their properties; and (ii) the body of curated patterns or set of reference image patterns is a database of curated anatomical regions within the sample as defined in an anatomical atlas; and (iii) the common spatial basis is provided by a spatial mapping of coordinates from the anatomical atlas to the property image or vice versa, obtained through image registration.

The method according to any one of the embodiments above, wherein the body of curated patterns or reference image patterns and image pattern to interpret are mapped to each other through a neighboring tissue section.

The method according to any one of the embodiments above, wherein the body of curated patterns or reference image patterns and image pattern to interpret are mapped to each other through a non-rigid registration.

The method according to any one of the embodiments above, wherein the body of curated patterns or reference image patterns and image pattern to interpret are mapped to each other using a free-form deformation model (FFD) that uses B-splines to calculate the mesh of control points.

The method according to any one of the embodiments above, wherein the squared correlation coefficient is used to iteratively calculate the similarity between the target image I and the source image J formulated as $$E_{CC}(T) = \frac{\left( \sum_{n=1}^{N} (I_n - \bar{I})(J_n - \bar{J}^T) \right)^2}{\sum_{n=1}^{N} (I_n - \bar{I})^2 \sum_{n=1}^{N} (J_n - \bar{J}^T)^2}$$

where $\bar{I}$ is the intensity mean of image I and $\bar{J}$ is the intensity mean of image J.

The method according to any one of the embodiments above, wherein any one of the image to interpret, body of curated patterns or reference image patterns, residuals or weights are represented as multidimensional arrays and the formulation of the model and/or optimization formulation is adjusted accordingly.

An automated system for anatomical interpretation of ion distributions in tissue, the system comprising a device for generating an image to interpret by a technique that images the spatial distribution of a particular property species of a sample of a molecular or chemical composition and a computing unit comprising a data processor and a storage unit, the storage unit comprising at least one algorithm for use by the data processor for carrying out a method according to any one of the embodiments above in a computer-readable environment.

A list of annotations that reports the elements of the resultant model, namely, the body of curated patterns or reference image patterns and their respective weights, obtainable by a method according to any one of the previous embodiments.

An encoded digital image that combines the elements of the resultant model, namely, the body of curated patterns or reference image patterns and their respective weights, to represent an image to interpret, e.g., the imaging mass spectrometry data and microscopic image data obtainable by a method according to any one of the previous embodiments.

A computer-implemented medical diagnosing based on the method according to any one of the previous embodiments on patient tissues.

A computer program embodied on a computer-executable medium and configured to be executed by a processor to process image interpretation according to any one of the previous methods of the embodiments.

A computer-readable non-transitory storage medium that stores a program that causes a processor to execute image processing according to any one of the previous methods of the embodiments.

Further scope of applicability of this disclosure will become apparent from the detailed description given hereinafter. However, it should be understood that the detailed description and specific examples, while indicating preferred embodiments of the disclosure, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention as claimed.

BRIEF DESCRIPTION OF THE DRAWINGS

This disclosure will become more fully understood from the detailed description given hereinbelow and the accompanying drawings, which are given by way of illustration only.

(FIG. 4B) Example of an ion query, finding anatomical regions in which m/z 7841 is highly expressed. The ion image of m/z 7841 is given as an input and the correlation table returns the spatial correlation to this ion image for all of the anatomical regions. Two examples of anatomical structure images that positively correlate with the target ion image are displayed.

(FIG. 5A) Ion m/z 742.57 is highly expressed in the somatosensory areas, the fiber tracts, and the pallidum. (FIG. 5B) Ion m/z 723.53 shows a decrease specifically in the somatosensory areas, as indicated by the negative weight. The empirical ion distributions show good congruence with the boundaries of the anatomical structures defined in the atlas, indicating good spatial mapping between the data sources, and strong biological signals in the IMS measurements.

FIG. 6 demonstrates affine registration of m/z 18411 to the experimental histology.

FIG. 7 demonstrates that experiment histology has a relatively high deformation compared to the reference histology in the Allen Mouse Brain Atlas. The need for non-rigid registration is apparent.

FIGS. 11A and 11B are graphics that display (FIG. 11A) an example of an anatomical query, finding ions specific to the caudoputamen. The anatomical structure image of the caudoputamen is given as input and the correlation table returns the spatial correlation to this structure for each ion image. Two examples of ion images that positively correlate with the target anatomical structure are displayed on the left. Examples of no correlation are shown in the middle, with examples of negative correlation on the right. (FIG. 11B) An example of an ion query, finding anatomical regions in which m/z 7841 is highly expressed. The ion image of m/z 7841 is given as an input and the correlation table returns the spatial correlation to this ion image for all the anatomical regions. Two examples of anatomical structure images that positively correlate with the target ion image are displayed on the left. Examples of no correlation are shown in the middle, with examples of negative correlation on the right.

(FIG. 15A) Ion m/z 9750 is highly expressed in the medial septal complex and the lateral septal complex. (FIG. 15B) Ion m/z 11312 is specifically absent in the pallidum. This is indicated by its negative contribution coefficient or weight, and is also clearly visible in the ion image. The empirical ion distributions show good congruence with the boundaries of the anatomical structures defined in the atlas, indicating good spatial mapping between the data sources, and strong biological signals in IMS measurements also in the protein-focused case study.

DETAILED DESCRIPTION

Definitions

Figure 1:
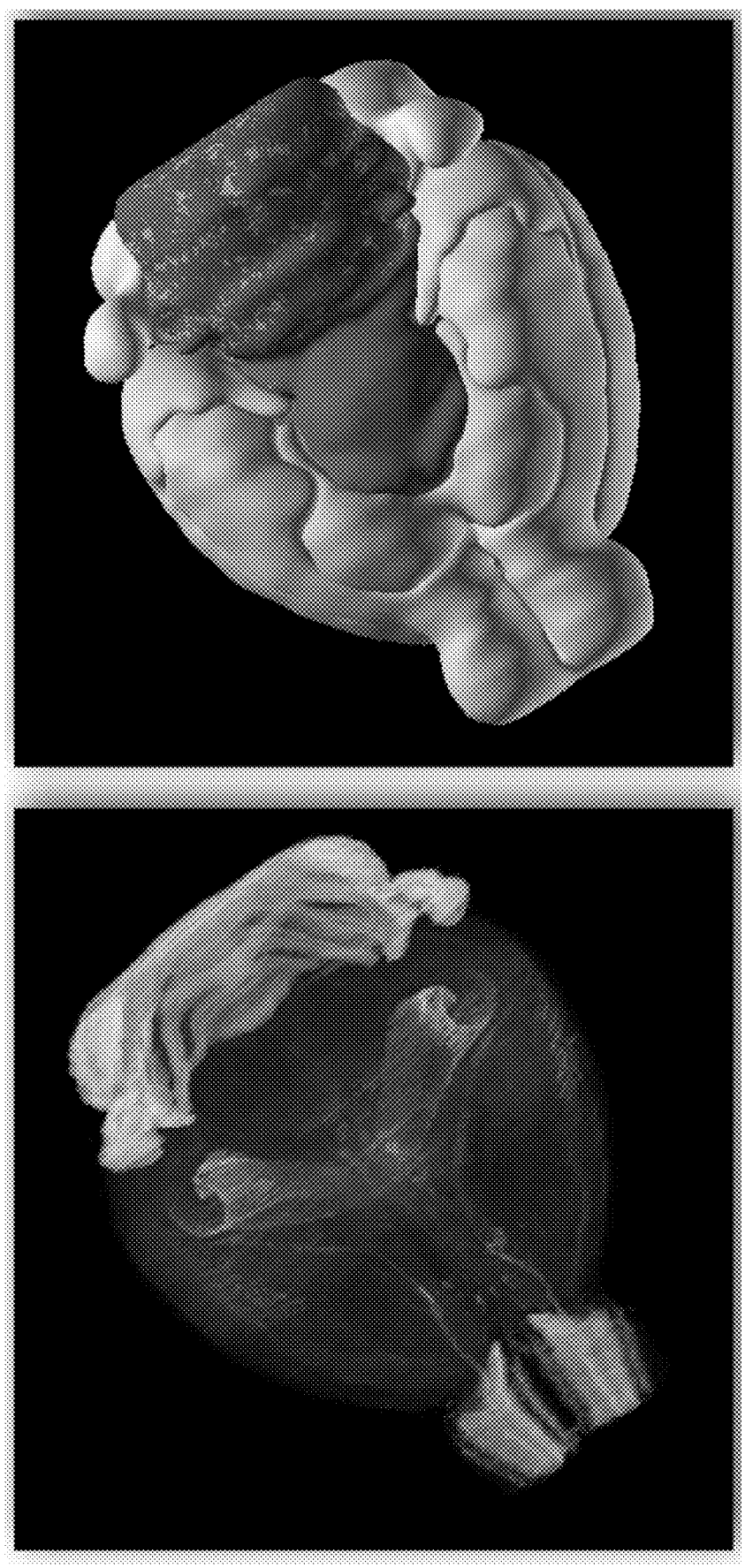
FIG. 1 provides a view of registered microscopy and anatomy in the Allen Mouse Brain Atlas. (left) The microscopy volume contains 528 coronal Nissl stained tissue sections. These data are imported into and visualized using MATLAB®, color-coding intensity from red to yellow. (right) The 3-D anatomical reference atlas contains over 800 anatomical structures. These data are visualized using the BRAIN EXPLORER® 2 software.

In this document, "provided patterns" or "PPs" are defined as the body of patterns provided to the method or system in order to interpret the image pattern with. The provided patterns or PPs constitute the vocabulary of patterns in which an interpretation of the image pattern will be expressed. When "provided patterns" or "PPs" is used, this does not include the IPTI or image pattern to interpret. The IPTI is supplied to the method as a separate input in addition to the PPs. For example, in the case of an ion image that is anatomically interpreted, the ion image is the IPTI and the set of anatomical patterns to interpret with are the provided patterns or PPs.

"Curated patterns" are defined as patterns that are selected, organized, composed, or prepared by a human operator. Curated patterns are accepted as a possible implementation of the provided patterns that will be used to interpret with. Curated patterns can comprise patterns that are broadly accepted and well-defined domain-wide (similar to anatomical patterns), but they can also entail patterns that are not widely accessible in public repositories or atlases, such as a sample-specific or study-specific vocabulary of relevant patterns. Examples of curated patterns can be patterns that are drawn up by a researcher on the basis of his prior knowledge on the sample, such as major chemical distributions that are to be expected in the sample. Another example would be a small sample-specific atlas that reports patterns of underlying cell organization in the sample (particularly if these patterns are not the same for different individuals in a species and, thus, are not part of anatomical atlases that represent the consensus across many individuals). Curated patterns is also considered as a name for PPs that do not report anatomical structures, but another type of patterns altogether. For example, this disclosure can be used to interpret an ion image in terms of a set of patterns that are important to the study at hand (e.g., a vocabulary of regions of interest that have been drawn up on the basis of an earlier study). Overall, this interpretation method is capable of using any set of provided patterns as a means for interpreting the IPTI, whether these provided patterns are anatomical patterns or curated patterns reporting another property.

The following detailed description of the disclosure refers to the accompanying drawings. The same reference numbers in different drawings identify the same or similar elements. Also, the following detailed description does not limit the disclosure. Instead, the scope of the invention is defined by the appended claims and equivalents thereof.

Several documents are cited throughout the text of this specification. Each of the documents herein (including any manufacturer's specifications, instructions, etc.) are hereby incorporated by reference; however, there is no admission that any document cited is indeed prior art of this disclosure.

This disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn to scale for illustrative purposes. The dimensions and the relative dimensions do not correspond to actual reductions to practice of the disclosure.

Furthermore, the terms "first," "second," "third," and the like in the description and in the claims, are used for distinguishing between similar elements and not necessarily for describing a sequential or chronological order. It is to be understood that the terms so used are interchangeable under appropriate circumstances and that the embodiments of the disclosure described herein are capable of operation in other sequences than described or illustrated herein.

It is to be noticed that the term "comprising," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to the devices consisting only of components A and B. It means that with respect to this disclosure, the only relevant components of the device are A and B.

Reference throughout this specification to "one embodiment" or "an embodiment" means that a particular feature, structure or characteristic described in connection with the embodiment is included in at least one embodiment of this disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the disclosure, various features of the disclosure are sometimes grouped together in a single embodiment, figure, or description thereof for the purpose of streamlining the disclosure and aiding the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Other embodiments of the disclosure will be apparent to those skilled in the art from consideration of the specification and practice of the disclosure described herein.

Analytical instrumentation and molecular imaging provide many different types of image patterns. These images are used to report on the content of organic samples such as tissue, or can report on various other characteristics of the sample. In the particular case of IMS, the technology delivers ion images that report the distribution of a particular molecular species throughout an organic tissue section. The problem with a multitude of the images being acquired is that they require interpretation. Also, in order to make the observations useful to medical professionals and biologists, the interpretation needs to be in terms of established anatomical definitions.

There are currently three typical responses to this challenge. The first is to have the interpretation done by an anatomy or medical expert. This option is probably the most reliable but brings a lot of practical problems along. For example, the throughput, time expense, and economical cost involved with having images interpreted manually is often unpractical or even prohibitive. There are also some questions as to the understanding the anatomy expert has of the image type they need to interpret, particularly with regard to understanding sensor-specific noise and variance, and avoiding it skewing the interpretation.

The second option is to have the image interpreted by a non-anatomy expert, which is usually an expert in the modality to interpret. Although this expert will have the knowledge to avoid drawing conclusions from modality-specific noise patterns, he/she will typically not have the anatomical background to exhaustively recognize the possible zones involved. The same practical issues of manual interpretation hold for this option as well, but there is also the additional problem of insufficient thoroughness, which might cause important findings to go unrecognized and make the drawing of substantial conclusions difficult.

A third option is to forego manual interpretation entirely and to do some form of computational analysis. Here, there are often little practical solutions at hand as usually computational approaches only become available for established imaging types (e.g., MRI) and not so much for modalities that are still being strongly developed (e.g., IMS). Also, in those approaches that are available, the method typically does little more than co-register anatomy to empirical images to help with human interpretation, or provide a rudimentary univariate assessment of relationship to the anatomy (e.g., correlation). As shown herein, such approaches are typically insufficient to obtain an anatomical explanation for the observed image pattern.

Since all of the available options have serious drawbacks, there is a need in the analytical instrumentation and molecular imaging fields for a generic interpretation system that can handle any imaging modality and any set of curated patterns in the same spatial basis, and provide a decomposition of image patterns in an automated way without requiring supervision. The demand is particularly great for a technology that can deliver such interpretation while retaining its exploratory potential by not requiring a pairing down of the images of interest prior to the analysis. Further needs include the reduction of human components in the analysis pipeline, as to avoid the introduction of bias, to reduce the labor-intensive nature of interpretation, and make certain types of analyses or hypothesis testing practical or even feasible.

Medical and pharmaceutical researchers and industry commonly look to the fields of molecular imaging and analytical instrumentation to deliver insights that advance the understanding of biological and pathological processes in tissue and other organic sample types. One of the problems that crops up is that the questions being asked to query these instrumental findings are often in anatomical terms and not in concepts familiar to the technologies in which the measurements are acquired (if such concepts even exist). There is, thus, a pressing need to find a means of interrogating imaging data such as ion images in terms of anatomy, and this without the problems tied to the options discussed in the previous section. From a medical standpoint, a system that could deliver an anatomical assessment of image patterns, even if it is basic and at the atlas-level, would be a significant step forward in making analytical findings digestible for non-domain experts and would open up vectors of research that might otherwise remain closed due to practical constraints.

This disclosure fills the needs highlighted above by providing a computational and automated bridge between empirically acquired image patterns and a complex and multivariate explanation of those image patterns in terms of a user-provided set of curated patterns such as those from an anatomical atlas.

The general framework of the system takes an image pattern to interpret, and delivers an optimal decomposition of this image pattern as a combination of curated patterns provided to the system. By delivering a decomposition (or an approximation) of the image pattern to interpret, the system essentially "explains" the image pattern using a vocabulary of curated patterns. The curated patterns are not necessarily of the same modality as the image to interpret. The system takes (i) an image pattern to interpret, (ii) a body of curated patterns to interpret the image pattern with, and (iii) a common spatial basis between the curated patterns and the image pattern. The definition of an optimal decomposition and, thus, the "best explanation," can be adjusted in accordance with the desired use-case and the data types involved. The framework described here can handle various forms of optimality that make sense for the application at hand, and does so without requiring significant adjustment to the architecture.

Key aspects are increased speed and reduced cost of anatomical interpretation, the reduction of human bias, parallelization, interpretations that go beyond univariate assessments of anatomical relation, and the automated nature of the interpretation.

At a high level, the invention is a system that searches for the best explanation of an observed image pattern in terms of a user-provided set of curated patterns. The search strategy can be implemented in various ways using different paradigms from machine learning and artificial intelligence. In our proof-of-concept implementation, the search strategy is approached as solving a convex optimization problem. Depending on the resources available, the type of data provided, and the use-case requirements on, for example, interpretation speed, the system can be implemented in hardware, software, or a mix of both.

The proof-of-concept implementation developed casts the problem of finding a suitable decomposition of the image pattern to interpret, and thus the problem of automated anatomical interpretation, as an optimization problem. The optimization problem considers each of the ion images that needs to be interpreted as a linear combination of the set of curated anatomical patterns extracted from an atlas. In addition to approximating the ion image patterns, the user can impose regularization constraints such as sparsity onto the linear combination, ensuring that only a minimal number of anatomy patterns is used. By solving this problem mathematically for the optimal linear combination, it essentially delivers a selection of the anatomy patterns involved in the ion image, and also a measure or weight for each of the selected anatomical zones. A mathematical description of this approach can be found herein under the section title "Automated Anatomical Interpretation."

The source code for the proof-of-concept method implementation and various examples was developed on the MATLAB® platform. The code makes use of an optimization environment, called CVX (Michael Grant and Stephen Boyd, *CVX: Matlab software for disciplined convex programming*, version 2.0 beta. http://cvxr.com/cvx, September 2013; and Michael Grant and Stephen Boyd, *Graph implementations for nonsmooth convex programs, Recent Advances in Learning and Control* (a tribute to M. Vidyasagar), V. Blondel, S. Boyd, and H. Kimura, editors, pages 95-110, *Lecture Notes in Control and Information Sciences*, Springer, 2008), and the various solvers that come bundled with it, to efficiently calculate the solution to the convex optimization problem. The environment concerns MATLAB® and various MATLAB® extension toolboxes (e.g., Statistics Toolbox; MATLAB® runs on the Windows 7 and Mac OS X operating systems with a CVX environment and solvers). The interpretation system can be implemented as a series of software instructions executed by a processor. However, given the massively multivariate nature of the calculations that need to take place, practical implementation of the method is preferably carried out in more than standard computer hardware (e.g., in memory, processing power, and parallelism). The efficiency of the method and the anatomical complexity that can be handled are highly dependent on whether or not dedicated hardware resources can be devoted to these tasks. Certain applications and modality implementations will not yield a workable implementation in software, and can only be practically implemented in dedicated hardware using components such as Field Programmable Gate Arrays (FPGAs).

The system of this disclosure combines aspects that were hereto unavailable together into a single technology and anatomical interpretation expert system. Compared to manual human interpretation, this disclosure, with its automated anatomical interpretation, distinguishes from manual human interpretation and computational approaches relating images to an anatomical atlas via basic registration and rudimentary univariate measures in having found a way to approach anatomical interpretation as a mathematical problem, and to have these computational solutions be able to compete and even exceed the performance of manual human interpretation. By casting the problem of finding an anatomical explanation for an observed image pattern as an algebraic problem that can be solved via established search and optimization techniques, the disclosure brings a wide set of technical advantages to the field of molecular imaging (see the technical advantages section below) and opens up completely novel avenues of technology.

Compared to computational approaches relating images to an anatomical atlas, this disclosure distinguishes in the complexity of explanation and interpretation that can be given. Current approaches are largely restricted to aiding human interpretation by registering anatomy pattern to images, but are commonly not capable of delivering any interpretation of the image. They are typically meant to aid manual human interpretation rather than work unsupervised. Although most approaches do not attempt image-vs-anatomy analysis, some approaches calculate univariate measures of relationship (e.g., correlation) between anatomical regions and observed images. It is shown herein that observed image patterns are rarely highlighting a single anatomical zone and any interpretation that is not multivariate is thus prone to misinterpret the majority of images. Further testament to this problem is that the gold standard in interpretation, manual human interpretation, also delivers multivariate explanations, which use the whole of an anatomical database concurrently. These human explanations concern combinations of multiple anatomical zones to describe the observations in a single image. If one argues that multi-membership and multivariate interpretations are a prerequisite to providing an anatomical explanation, it would follow that the currently available computational approaches are not delivering anatomical interpretation at all. This disclosure does provide those aspects, and can thus provide anatomical interpretation in an automated way. The novelty of the disclosure thus lies in being a computational method that can provide human-grade anatomical interpretation, differentiating itself from other computational approaches involved in anatomy-vs-image settings.

Worth mentioning is that due to the multivariate approach to anatomical interpretation, the disclosure can provide additional information that is usually not available when manual human interpretation is involved. In addition to the qualitative information provided by the decomposition, which comprises selected anatomical regions involved in the image pattern (essentially what is provided by a human interpreter as well), the disclosure also provides quantitative information for each selected anatomical zone. This quantitative information is a weight factor for each anatomical pattern that indicates how important that zone is in the overall explanation of the observed image pattern. These weights are not available from manual human interpretation workflows, yet can have significant use for subsequent analysis and the drawing of conclusions. In the IMS examples, these weights inherently take the form of ion intensities and thus indirectly report the molecular abundance in each of the selected anatomical regions, making it possible to sub-select anatomical regions of interest on the basis of ion abundance. Such information is currently not available from any other source.

It is important to note that this disclosure has been developed as a cross-disciplinary solution to a persistent need in the biomedical and biological communities and industry, as well as in the analytical instrumentation and molecular imaging fields. In an embodiment, the system of this disclosure became feasible when (a) the computational insight into what makes up a strong anatomical interpretation had matured to a point where the problem could be cast in a mathematical form, solvable by electronics and/or computers; (b) the instrumental state-of-the-art had progressed to a point where imaging mass spectrometry delivers massive ion image data sets of a quality that requires and merits deep anatomical analysis; and (c) the biomedical field developed an appetite for analytical imaging data at a scale such that the major bottleneck becomes the human component. The fact that this system was developed in a laboratory specifically focused on IMS technology, and recognized by institutions such as the NIH as a center of excellence on this topic, further underlines the emergent nature of the disclosure and shows how, prior to these developments, a system with these characteristics would not have been feasible. The need for a system that solves the interpretation problem is further underlined by the fact that the system was developed in international collaboration between major labs in their own respective fields, requiring a wide variety of expertise to meet the challenge.

Compared to manual human interpretation, the major non-obvious step is how to cast a typically human activity (image pattern interpretation) into a mathematical form that can be solved by calculation without supervision.

Compared to computational approaches, the major non-obvious step is the multivariate decomposition structure of an interpretation, stepping away from univariate approaches that cannot handle the complexity of deep anatomical interpretation and thus are not capable of competing with human interpretation. An additional non-obvious aspect is the use of the regularization principle from algebra to make the requested interpretation more specific (e.g., the L^1-norm for a sparse interpretation, the L^2-norm for broad selection of all possible anatomical zones involved, etc.). The influence of the regularization term on the final anatomical interpretation is non-trivial and non-obvious, and this sort of control is not available from any other method known.

The system of this disclosure pursues and solves a task that is substantially different from registration altogether. Although registration-related approaches do not overlap with the methodology of this disclosure, they are a prerequisite for the interpretation system to solve its analysis task. More precisely, the system requires prior establishment of a common spatial basis between the body of anatomical (or otherwise curated patterns) and the pattern or image one wants to interpret. This common spatial basis between the anatomical body of information and the image pattern to be interpreted can, for example, be obtained through image registration techniques, but is not limited to these approaches. The task this disclosure solves is "Once a common spatial basis is established (e.g., through registration), how do we use the different data sets to accomplish an anatomical interpretation task?". In that sense, the disclosure and what one could consider the closest prior art are largely orthogonal in goal and method.

EXAMPLES

Since a substantial amount of IMS research focuses on rodent brain (K. Sköld, M. Svensson, A. Nilsson, X. Zhang, K. Nydahl, R. M. Caprioli, P. Svenningsson, and P. E. J. Andrén, *Proteome Res.* 2006, 5:262-269), the case studies herein use MALDI-TOF IMS data from mouse brain tissue as the empirical data source and the Allen Mouse Brain Atlas (E. S. Lein, M. J. Hawrylycz, N. Ao, M. Ayres, A. Bensinger, A. Bernard, A. F. Boe, M. S. Boguski, K. S. Brockway, E. J. Byrnes, and L. Chen, et al., *Nature* 2007, 445:168-176) as the curated anatomical data source. Both data types have been used in studies of neurodegenerative diseases such as Alzheimer's, Parkinson's, and healthy mouse brain (A. R. Jones, C. C. Overly, and S. M. Sunkin, *Nat. Rev. Neurosci.* 2009, 10:821-828; and J. Hanrieder, N. T. N. Phan, M. E. Kurczy, and A. G. Ewing, *ACS Chem. Neurosci.* 2013, 4:666-79). However, the methods developed herein are not specific to these case studies, a particular species, disease model, or atlas. They can be readily applied to any IMS-atlas combination that makes sense within the context of a particular study.

The Methods section introduces the two data sources and describes the three computational methods developed: (i) registration, (ii) correlation-based querying, and (iii) automated anatomical interpretation. The developed methods were applied to both a protein-focused and a lipid-focused case study, with complementary details.

Methods

The first objective, the integration of the two data sources, entails development of two computational methods. The first method spatially registers the IMS data to the anatomical atlas. Registration is a necessary step that precedes anatomical interpretation and makes direct mapping of findings across data sources possible by establishing a common coordinate system (L. G. Brown, *ACM Comput. Surv.* 1992, 24:325-376; W. Crum, T. Hartkens, and D. L. Hill, *Br. J. Radiol.* 2004, 77 Spec No.; and A. Myronenko, "Non-rigid Image Registration: Regularization, Algorithms and Applications," Oregon Health & Science University: Department of Science & Engineering School of Medicine, 2010, p. 316). Since the methods that follow are independent of how this spatial mapping is established and are quite robust against registration errors, a relatively basic registration implementation is provided. A more advanced and automated registration procedure is available in Abdelmoula et al. (W. M. Abdelmoula, R. J. Carreira, R. Shyti, B. Balluff, R. J. M. van Zeijl, E. A. Tolner, B. F. P. Lelieveldt, A. M. J. M. van den Maagdenberg, L. A. McDonnell, and J. Dijkstra, *Anal. Chem.* 2014, 86:3947-54). Since the registration needs to account for cutting artifacts, tissue deformations due to extraction and freezing of the brain, and other spatial perturbations, non-rigid registration techniques (L. G. Brown, *ACM Comput. Surv.* 1992, 24:325-376; and W. Crum, T. Hartkens, and D. L. Hill, *Br. J. Radiol.* 2004, 77 Spec No.) play a central role here. The second method utilizes the established link to interrogate the combined data sources for correlations. Correlation-based queries deliver insight into the spatial correlations between ion images in IMS and anatomical areas in the atlas. In previous studies, the applicants, as well as several other groups, have successfully demonstrated the potential of correlation-based approaches to guide the user toward relevant findings (W. M. Abdelmoula, R. J. Carreira, R. Shyti, B. Balluff, R. J. M. van Zeijl, E. A. Tolner, B. F. P. Lelieveldt, A. M. J. M. van den Maagdenberg, L. A. McDonnell, and J. Dijkstra, *Anal. Chem.* 2014, 86:3947-54; J. Bruand, S. Sistla, C. Mériaux, P. C. Dorrestein, T. Gaasterland, M. Ghassemian, M. Wisztorski, I. Fournier, M. Salzet, E. Macagno, and V. Bafna, *J. Proteome Res.* 2011, 10:1915-28; F. Suits, T. E. Fehniger, A. Végvári, G. Marko-Varga, and P. Horvatovich, *Anal. Chem.* 2013, 85:4398-404; T. E. Fehniger, F. Suits, Á. Végvári, P. Horvatovich, M. Foster, and G. Marko-Varga, *Proteomics* 2014, 14:862-71; R. Van de Plas, K. Pelckmans, B. De Moor, and E. Waelkens in *The NIPS workshop on Machine Learning in Computational Biology* (NIPS MLCB); B. C. Whistler, 2007, pp. 1-4; and L. A. McDonnell, A. van Remoortere, R. J. M. van Zeijl, and A. M. Deelder, *J. Proteome Res.* 2008, 7:3619-27. When the integration objective is complete, anatomical regions are implicitly annotated with biochemical findings from mass spectrometry, and bio-molecular distributions are inherently mapped to a set of anatomical definitions.

The second objective moves beyond registration and simple correlation and uses the established IMS-anatomical atlas link to develop an automated anatomical interpretation method for IMS data. The anatomical interpretation of an ion image is defined as decomposing the ion distribution into a combination of known anatomical areas that are tentatively tied to that specific ion. Anatomical interpretation becomes possible once a registration of IMS data to an atlas is available. Since it is independent of the particular method that was utilized to attain such registration, and it is assumed that registration errors are always present to some extent, automated anatomical interpretation methods can be developed largely orthogonal to, but still benefit from any registration advancements. The interpretation method developed can, therefore, be used in any setting where IMS is coupled to an atlas. Although the correlation-based queries demonstrate the functioning of the IMS-to-atlas mapping and provide a first step toward exploration of the combined data, they are insufficient to power automated anatomical interpretation of ion images. The main reason is their inadequate handling of ions that are present in several anatomical areas simultaneously. An automated anatomical interpretation of ion images, therefore, needs to be able to handle membership of an ion to multiple anatomical structures, and preferably should include a measure of abundance. To this end, the third computational method of this work develops an algorithm that uses the IMS-atlas link to automatically interpret any ion image in the IMS data set as a combination of atlas-provided anatomical structures, without the need for human intervention.

Anatomy Data. The publicly accessible Allen Mouse Brain Atlas (AMBA) is used as the anatomical data source. This atlas is based on the brain of a 56-day-old C57BL/6J mouse, and has a user base that exceeds 10,000 users per month (A. R. Jones, C. C. Overly, and S. M. Sunkin, *Nat. Rev. Neurosci.* 2009, 10:821-828). The brain is dissected into 528 coronal tissue sections at 25 µm separation, which are Nissl stained, registered to each other, and assembled into a reconstructed brain volume. A low resolution (25 µm voxel width) gray-scale version of this reconstructed brain volume is accessible through the application programming interface provided by the AMBA website,[35] and is imported into MATLAB® 2012b (The Mathworks Inc., Natick, Mass.) to establish a local copy for further computation (FIG. 1).

Of the 528 coronal tissue sections, 132 are hand annotated and combined to create a 3-D anatomical reference atlas (FIG. 1). This atlas is registered to the brain volume constructed from the Nissl stains and contains over 800 anatomical structures. It can be consulted using the BRAIN EXPLORER® 2 software (AMBA website).

IMS Data.

Coronal tissue sections of 12 µm thickness were acquired from a healthy adult mouse brain that had been frozen in liquid nitrogen. Two neighboring sections from this brain were selected for IMS measurement, and mounted on ITO-coated glass slides. A third neighboring section was mounted on a glass slide and Nissl-stained for matching against the Nissl-stains of the AMBA. An overview of the staining and IMS measurements is given below; refer to Supplementary Information for full details. One IMS measurement focuses on protein imaging, acquiring ions between m/z 3000 and 22000. The other IMS measurement focuses on lipids with an m/z range from 400 to 1000. The tissue sections were sublimated with sinapinic acid (protein-oriented) and 1,5-diaminonaphthalene (lipid-oriented). The measurements were acquired on a BRUKER® AUTOFLEX® Speed MALDI-TOF mass spectrometer in positive linear mode with a laser spot size of 80 µm on target and at a pitch of 100 µm (protein-oriented) and in negative reflector mode with a laser spot size of 30 µm on target and at a pitch of 80 µm (lipid-oriented), using FlexControl 3.3 software. Approximately 100 shots/spot were acquired at a 1 kHz repetition rate using a Smartbeam II Nd:YAG laser. Image acquisition was carried out using FlexImaging 2.1 and further processing took place in MATLAB®. The spectra were normalized on the basis of their common ion current, disregarding differential peaks (R. Van de Plas, *Tissue Based Proteomics and Biomarker Discovery—Multivariate Data Mining Strategies for Mass Spectral Imaging*, K U Leuven (Leuven, Belgium): Faculty of Engineering, 2010, p. 245). They were baseline-corrected using a spline approximation of the baseline at the 10%-quantile of ion intensities, and employing window sizes of 500 and 50 and step sizes of 250 and 25 for the protein and lipid-focused spectra, respectively. The spectra were also optimally aligned along the m/z axis to reduce peak drift, allowing a maximum m/z shift of 12 and 0.5 for protein and lipid-focused spectra, respectively. Both steps were performed using the Bioinformatics Toolbox of MATLAB® (The Mathworks Inc., Natick, Mass.).

Registration of Data Sources.

Coupling IMS data to the atlas requires the two data sources to be registered to each other, thus transforming them to a common coordinate system, in which their pixel locations describe the same space and can be directly compared (L. G. Brown, *ACM Comput. Surv.* 1992, 24:325-376; and W. Crum, T. Hartkens, and D. L. Hill, *Br. J. Radiol.* 2004, 77 Spec No.). The IMS-atlas registration process is carried out in multiple steps and uses both rigid and non-rigid registration to handle the complexities that are commonly encountered in tissue (e.g., deformation during extraction and freezing of the brain, differences between individual mouse brains, cutting artifacts, etc.). To deal with these complex deformation cases, non-rigid registration techniques (R. D. Eastman, J. Le Moigne, and N. S. Netanyahu, in 2007 IEEE Conference on Computer Vision and Pattern Recognition, *IEEE,* 2007, pp. 1-8; and D. Rueckert, L. I. Sonoda, C. Hayes, D. L. G. Hill, M. O. Leach, and D. J. Hawkes, *IEEE Trans. Med. Imaging* 1999, 18:712-721) are important.

Figure 2:
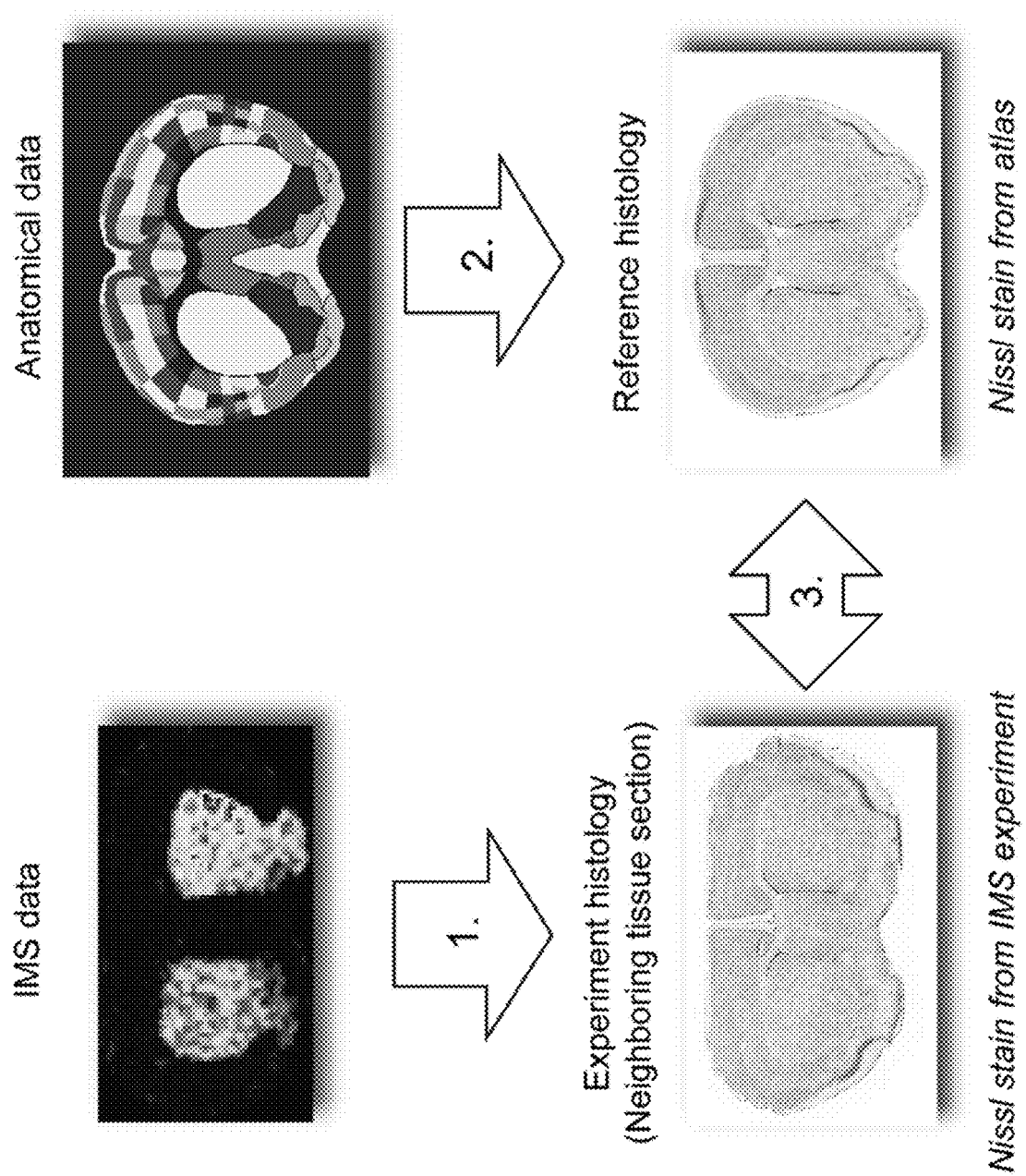
FIG. 2 provides a schematic diagram showing a workflow of the registration process. Spatially registering IMS data to anatomical data comprises three individual registration steps: (1) rigid registration of IMS data to experiment histology, (2) rigid registration of anatomical data to reference histology, and (3) non-rigid registration of experiment histology to reference histology.

The IMS data is registered to the anatomical atlas via a modality common to both data sources: stained microscopy (FIG. 2). The registration process entails: (1) rigid registration of IMS data to the experiment histology, (2) rigid registration of atlas data to the reference histology, and (3) non-rigid registration of the experiment histology to the reference histology. Although it is technically possible to register IMS data directly to the atlas, it is preferable to go through histology since the IMS data and the atlas data are of a substantially different nature with very differing spatial resolutions (respectively, 80-100 µm and 0.3 µm). Using microscopy as an intermediate offers several advantages: (i) registration is more straightforward within a single modality, certainly given the complexity involved in non-rigid registration, (ii) the resolutions are high and comparable, and (iii) histological microscopy is readily available in most state-of-the-art IMS experiments.

Details of the registration process can be found in this application. To summarize, (1) the rigid registration between IMS data and experiment histology is performed in MATLAB® through manual selection of fiducial markers, (2) the rigid registration from atlas to reference histology is provided by the AMBA, and (3) the non-rigid registration between experiment histology and reference histology is performed using the Medical Image Registration Toolbox (MIRT) by Myronenko (A. Myronenko, "Non-rigid Image Registration: Regularization, Algorithms and Applications," Oregon Health & Science University: Department of Science & Engineering School of Medicine, 2010, p. 316), making use of a free-form deformation (FFD) model.

Correlation-based Querying.

Once registration is complete, it becomes possible to find out which anatomical structures correlate with a measured ion distribution, or which ions correlate with a certain anatomical zone of interest. To enable this simple form of correlation-based querying, an anatomical structure image was created for each individual anatomical structure that is present in the tissue slice. Such an anatomical structure image (caudoputamen example at top in FIG. 4A) represents the spatial location of a single anatomical annotation, and contains ones in locations where the anatomical structure is present, and zeros elsewhere. To soften the binary assignments somewhat at the edges of the structure, a Gaussian filter was applied, which eliminates crisp borders.

Next, the spatial correlation between an ion image and an anatomical structure image is obtained by calculating the Pearson correlation coefficient between the intensities of both images over all IMS measurement locations. Only pixels for which both types of data are available are part of the correlation analysis to prevent bias. The analysis is performed by reshaping both 2D images to 1D vectors, removing any rows for which only one type of information is available, and then calculating the correlations between the resulting vectors. The correlation coefficient for each possible anatomical structure/ion image combination is calculated and collected into a correlation table for easy visualization and querying.

Automated Anatomical Interpretation.

The goal of the anatomical interpretation method is to examine the pattern in an ion image and, without human intervention, determine which anatomical structures are involved and what their ion intensity contribution is. In other words, once an ion image is mapped to the atlas (using the proposed registration pipeline or an automated variant thereof) (W. M. Abdelmoula, R. J. Carreira, R. Shyti, B. Balluff, R. J. M. van Zeijl, E. A. Tolner, B. F. P. Lelieveldt, A. M. J. M. van den Maagdenberg, L. A. McDonnell, and J. Dijkstra, *Anal. Chem.* 2014, 86:3947-54), the interpretation method takes that ion distribution pattern as an input and then automatically decomposes it into a combination of atlas-provided anatomical structures.

At its core, anatomical interpretation is a problem of approximating the spatial pattern of an ion with a combination of patterns selected from a provided vocabulary of anatomical patterns. The model employed in this algorithm considers an ion image to be a sum of products, each product multiplying a pattern from the finite set of anatomical patterns with its contribution coefficient. Since both the ion image and the anatomical patterns are known and their relationship is established by the model, the search for the optimal anatomical contribution coefficients (and, thus, the optimal anatomical interpretation) can be approached as a multivariate optimization problem. The mathematical details of this approach are provided in this application.

The implementation uses CVX, a package for specifying and solving convex programs (M. Grant and S. Boyd, in *Recent Advances in Learning and Control*, V. Blondel, S. Boyd, and H. Kimura, Eds.; Springer-Verlag Limited, 2008; pp. 95-110; and M. Grant and S. Boyd, CVX: MATLAB® Software for Disciplined Convex Programming, version 2.0 beta; 2012), to solve the optimization problem for each ion image desired to be interpreted. The anatomical patterns are used as building blocks to construct an approximation of each ion image, and the coefficients specify how each anatomical structure contributes to the overall approximation. A nice feature of the method is that an anatomical contribution coefficient tends to be proportional to the ion intensity in that anatomical structure, inherently assigning a notion of importance or weight to each anatomical zone involved. Anatomical images, and, thus, structures, corresponding to high absolute coefficients are important for approximating the ion distribution of interest, and are, therefore, considered part of the anatomical interpretation of that ion image. Also, note that in the examples, the coefficients are not constrained to positive values. This allows the anatomical interpretation to say things like "the ion seems to be present in zone A plus zone B minus zone C."

IMS Data Acquisition and Microscopy Staining Details

Materials

Ethanol, acetonitrile (ACN), and acetic acid were purchased from Fisher Scientific (Suwanee, Ga.), xylene was purchased from Acros (Morris Plains, N.J.), and chloroform, 1,5-diaminonaphthalene (DAN), and methanol were purchased from Sigma-Aldrich (Milwaukee, Wis.). Sinapinic acid (SA) was purchased from Oakwood Products, Inc. (SC), and recrystallized twice with 70% ACN. Conductive indium tin oxide (ITO)-coated microscope glass slides were purchased from Delta Technologies (Stillwater, Minn.). Cresyl Violet (for Nissl stain) was purchased from Electron Microscope Sciences (Hatfield, Pa.). MILLI-Q® water was from a MILLI-Q® Advantage A10 Ultrapure Water Purification System (Millipore, Billerica, Mass.).

Carnoy's fluid was prepared from 60 mL of ethanol, 30 mL of chloroform, and 10 mL of acetic acid. Fresh frozen mouse brain was purchased from Pel-Freez Biologicals (Rogers, Ariz.), and was sectioned using a Leica CM3050 cryostat (Leica Microsystems GmbH, Wetzlar, Germany). Frozen tissue sections were thaw mounted on cold ITO-coated microscope slides. Serial sections were prepared for MS imaging and optical imaging.

Sample Preparation for Imaging Mass Spectrometry of Proteins

Briefly, mouse brain sections of 12 µm thickness were rinsed with 70% ethanol for 30 seconds, 100% ethanol for 30 seconds, Carnoy's fluid for 2 minutes, 100% ethanol for 30 seconds, $H_2O$ for 30 seconds, and 100% ethanol for 30 seconds. The sections were then dried for 10 minutes under ambient conditions and sublimated with sinapinic acid to obtain a coating of 0.2 mg/cm². The SA-coated slides were then treated with $H_2O$: acetic acid (1 mL: 50 µL) vapor to recrystallize (J. Yang and R. M. Caprioli, *Anal. Chem.* 2011, 83:5728-5734) the SA coating for 3.5 minutes under 85° C.

Sample Preparation for Imaging Mass Spectrometry of Lipids

Tissue sections of 12 µm thickness were sublimated with DAN to obtain a matrix coating of 0.2 mg/cm² and were then treated with vapor of water:methanol:chloroform (40:30:10) at 85° C. for 2 minutes. The procedure is similar as in the literature mentioned above, but with 2 minutes and a total volume of 30 µL of liquid.

Nissl Staining of Tissue Sections for Microscopy

Literature Reference

*Histological and Histochemical Methods: Theory and Practice*, 4th edition, edited by J. A. Kiernan, Publisher: Cold Spring Harbor Laboratory Press; (Mar. 1, 2008), ISBN-10: 1904842429.

Procedure:
1. Dehydrate: 75% ethanol for 30 seconds—95% ethanol for 30 seconds—100% ethanol for 30 seconds—100% ethanol for 30 seconds—Xylene for 30 seconds—Xylene for 30 seconds—Xylene for 30 seconds.
2. Rehydrate and stain: Xylene for 30 seconds—Xylene for 30 seconds—100% ethanol for 30 seconds—100% ethanol for 30 seconds—95% ethanol for 30 seconds—75% ethanol for 30 seconds—MILLI-Q® H$_2$O for 30 seconds—Cresyl violet for 10 minutes.
3. Destain: MILLI-Q® H$_2$O—75% ethanol 30 seconds—95% ethanol 30 seconds—100% ethanol for 30 seconds—100% ethanol for 30 seconds—Xylene for 30 seconds—Xylene for 30 seconds—Xylene for 45 minutes.
4. Coverslip The stained sections were scanned using a Mirax slide scanner from Zeiss with 0.33 μm spatial resolution.

Mass Spectrometry and Data Analysis

MALDI MS analyses were performed on a BRUKER® AUTOFLEX® Speed MALDI-TOF mass spectrometer in positive linear mode (proteins) and a BRUKER® AUTOFLEX® Speed TOF/TOF mass spectrometer in negative reflector mode (lipids) using FlexControl 3.3 software. Approximately 100 shots/spot were acquired with a 1 kHz repetition rate Smartbeam II Nd:YAG laser. Image acquisition was carried out using FlexImaging 2.1 and spectral analysis was performed with FlexAnalysis 3.3 and MATLAB®.

Registration Process Details

This section gives a more detailed description of the registration process.

1. Registration of IMS Data to Experimental Histology

The first registration step maps IMS locations (at 80 and 100 μm resolution for lipids and proteins, respectively) to the experimentally acquired microscopy image of the neighboring Nissl-stained tissue section (0.3 μm resolution), further referred to as the experiment histology.

While it is common practice in IMS experiments to overlay ion images on a neighboring tissue section for visualization purposes, extra care is taken since here, this alignment will become part of a larger registration pipeline.

The alignment is based on the use of an affine transformation matrix and involves several processing steps:

Selecting an m/z that clearly co-localizes with a well-defined anatomical structure: here, ion m/z 18411 was selected, which clearly delineated the corpus callosum (FIG. 6), a good reference structure for registration.

Loading both the ion image (m/z 18411) and the experiment histology into MATLAB® and selecting landmark points using the cpselect function.

Using these landmarks to create the affine transformation matrix that determines the registration by employing the MATLAB® function cp2tform.

2. Registration of Atlas Data to Reference Histology

The second step registers the anatomical atlas to the microscopy of the reference Nissl stain, which is included with the atlas and hereafter referred to as the "reference histology." The registration from atlas to reference histology is taken care of by the Allen Mouse Brain Atlas, which provides these modalities already in a registered state, making step 2 for the purposes herein a straightforward identity transformation. Out of the reference stains provided with the atlas, the closest structural match to the experiment histology is manually selected, identical to how a medical professional would select a reference tissue in the atlas for anatomical interpretation. Alternatively, the closest matching tissue can be selected automatically using methods such as those proposed by Abdelmoula et al. (W. M. Abdelmoula, R. J. Carreira, R. Shyti, B. Balluff, R. J. M. van Zeijl, E. A. Tolner, B. F. P. Lelieveldt, A. M. J. M. van den Maagdenberg, L. A. McDonnell, and J. Dijkstra, *Anal. Chem.* 2014, 86:3947-54). Automatic selection can be helpful in certain situations (e.g., when a large number of tissues needs to be registered at once), but is not always desirable (e.g., in the case of partially matching tissues due to a skewed cut, where a winner-takes-all mechanism may give incorrect results). Since the selection needs to happen only once for each IMS experiment, taking care of the spatial mapping for potentially thousands of ion images in a single action, the selection mechanism is typically not a bottleneck to the interpretation efforts and its implementation can be tailored to the particular study at hand. The reference stains are all in gray-scale and have been down-sampled to 25 μm resolution.

3. Registration of Experimental Histology to Reference Histology

Figure 9:
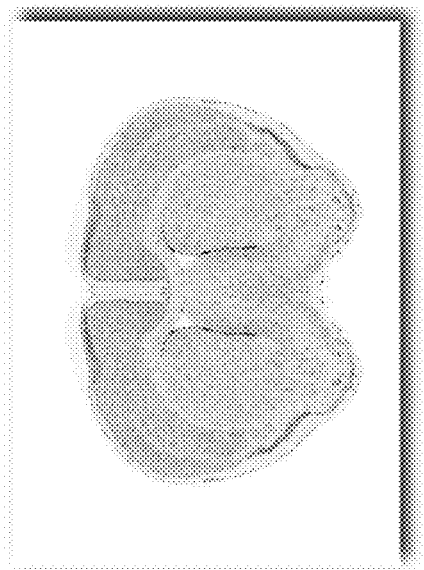
FIG. 9 demonstrates results of the non-rigid registration process. Despite the high initial deformation of the experiment histology (see FIG. 7), the registered version looks very similar to the reference histology. The lower images show examples of using this non-rigid transformation to register IMS data to the reference histology.
Figure 9:
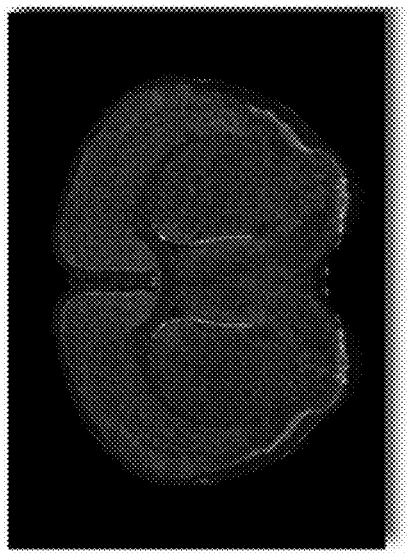
Figure 9:
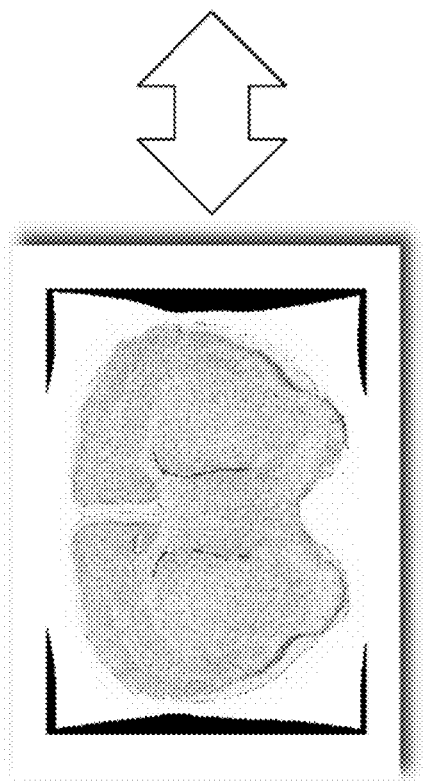
Figure 9:
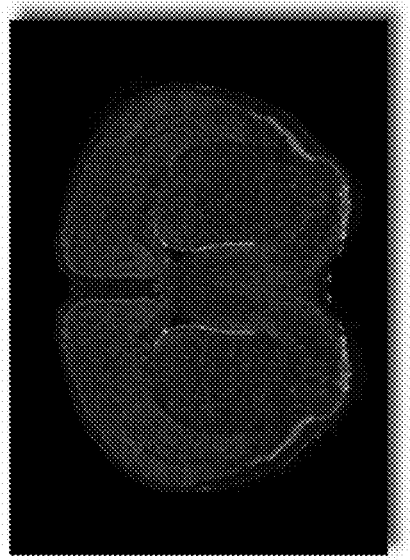

The registration between the experiment histology and the reference histology is the most difficult step in the registration process, as it has to account for tissue deformation during extraction and freezing of the brain, and cutting artifacts. As can be seen in FIGS. 7 and 9, the experiment histology has a relatively high deformation compared to the reference histology from the Allen Mouse Brain Atlas. While this may seem problematic for a correct registration of both images, this deformation can be accounted for by using non-rigid image registration techniques.

Preliminary Processing

Difference in Resolution

As the reference histology is provided at 25 μm resolution, and the experiment histology has a resolution of 0.33 an intermediate resolution of 5 μm is used for the registration. Thus, the experiment microscopy picture is downsampled with a factor of 15 and the reference microscopy is up-sampled with a factor of 5, using the imresize function provided in MATLAB®.

Difference in Color Scheme

As the reference microscopy is provided in grayscale, the experiment microscopy is converted to grayscale as well.

Rigid Registration

The experiment histology is first centered and scaled to the reference histology using a rigid registration, in order to get a good starting point for the non-rigid registration. This is done in MATLAB® by selecting landmark points using the cpselect function. These landmarks are then used to create the affine transformation matrix that determines the registration by employing the MATLAB® function cp2tform.

Non-Rigid Registration

The non-rigid registration is performed using the algorithms from the Medical Image Registration Toolbox (MIRT) by Myronenko (A. Myronenko, "Non-rigid Image Registration," PhD. Dissertation, Oregon Health & Science University, 2010). A non-rigid registration contains a similarity measure and a transformation model. The similarity measure defines how pixels are compared between images, while the transformation model determines the types of non-rigid transformations allowed.

Similarity Measure

The squared correlation coefficient is used as a similarity measure to compare the intensities of pixels across the images. The squared correlation coefficient is maximized when the images are linearly related, and is defined as $$E_{CC}(T) = \frac{\left(\sum_{n=1}^{N}(I_n - \bar{I})(J_n - \bar{J}^T)\right)^2}{\sum_{n=1}^{N}(I_n - \bar{I})^2 \sum_{n=1}^{N}(J_n - \bar{J}^T)^2}$$

where $\bar{I}$ is the intensity mean of image I and $\bar{J}$ is the intensity mean of image J. The medical image processing literature shows that the best choice of similarity measure is dependent on the particularities of the data at hand. For these case studies, the squared correlation coefficient empirically showed sufficiently good results, so no further benchmarking of similarity measures needed to be pursued. Further improvements of the registration phase are welcome but not essential to the correct functioning of the anatomical interpretation phase, since its optimization formulation allows the interpretation output to degrade gracefully as the number of registration errors rises. The entire registration procedure was run on a desktop computer.

Transformation Model

Figure 8:
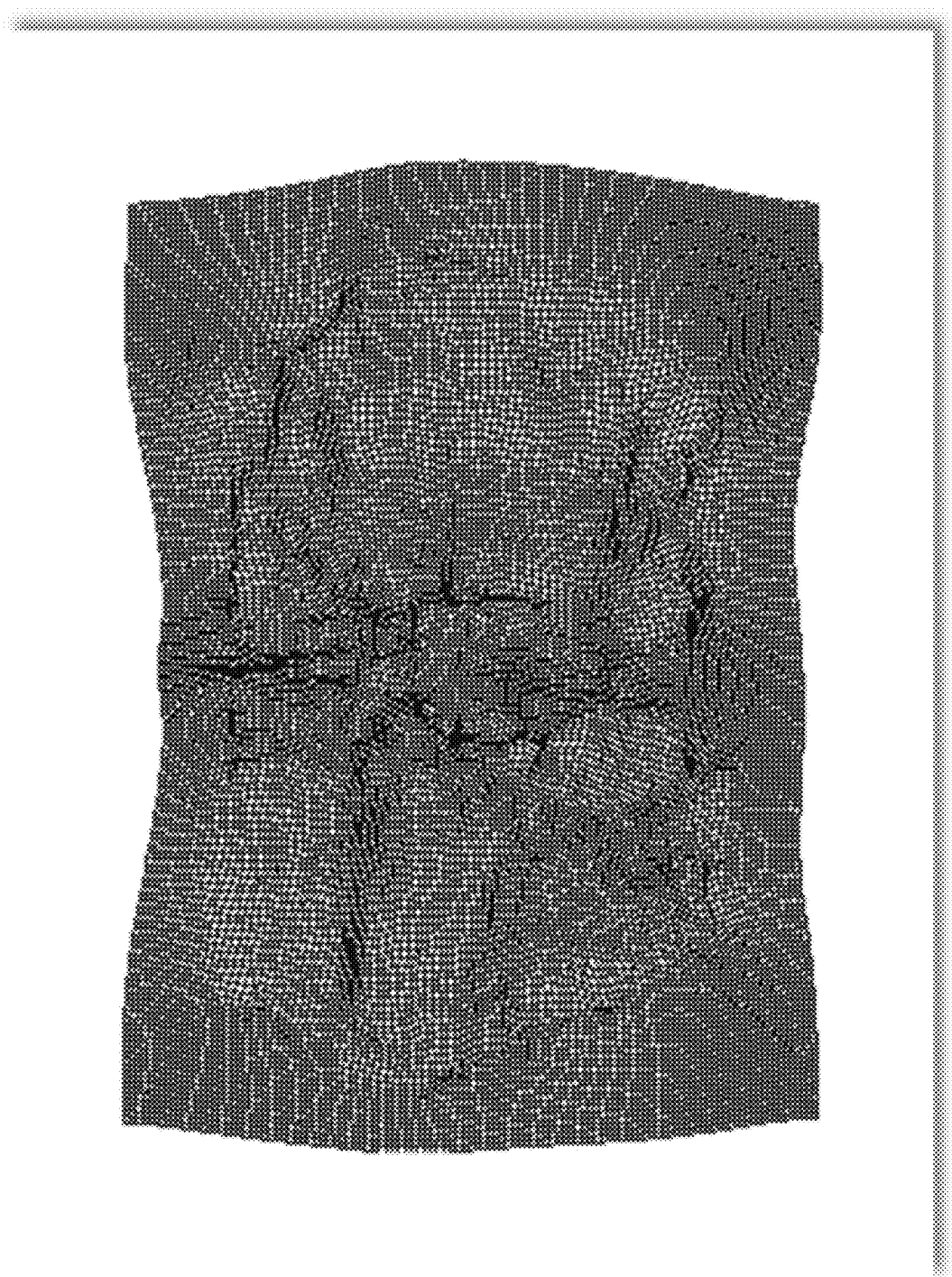
FIG. 8 depicts that the Free-Form Deformation registration method uses a mesh of control points to register the experimental histology to the reference histology. The number of admissible transformations is limited by the spacing of the control points and by the smoothness of the B-spline basis functions.

As a transformation model, the Free-Form Deformation (FFD) was used, which is a popular non-rigid registration model that uses a mesh of control points (example in FIG. 8). In this mesh, each control point is connected to its neighbor, and each location in between these control points is interpolated via B-spline basis functions. The number of admissible transformations is limited by the spacing of the control points and by the smoothness of the B-spline spline basis functions. The degree of non-rigid deformation that can be modeled depends on the resolution of the mesh of control points, which in turn determines the computational complexity. In order to have an optimal trade off between computational complexity and admissible deformation, the MIRT uses a hierarchical multi-resolution approach, as suggested by Rueckert et al. (D. Rueckert, L. I. Sonoda, C. Hayes, D. L. G. Hill, M. O. Leach, D. J. Hawkes, *IEEE Trans. Med. Imaging* 1999, 18:712-721), in which the resolution of the control mesh is increased, along with the image resolution, in a coarse to fine fashion. The initial mesh size used comprises 8×8 control points, with four consecutive hierarchical levels.

Using the results of the affine registration as a starting point, the experimental histology is registered to the reference histology using the above settings. The result of the registration can be seen in FIG. 9, which shows very good matching despite the relatively large initial deformation.

Automated Anatomical Interpretation Details

This section gives a more detailed description of the automated anatomical interpretation process.

The goal of the anatomical interpretation method is to take a mapped ion image, and to decompose that ion distribution pattern into a combination of atlas-provided anatomical structures, without the need for human intervention. At its core, it is a problem of approximating the spatial pattern of an ion with a combination of patterns selected from a provided vocabulary of anatomical patterns. The algorithm developed, therefore, considers the ion image to be a sum of contributions from a finite set of anatomical patterns, and uses a least-squares argument to approach this challenge as a multivariate optimization problem. Consider the set of anatomical structure images previously defined in the section on correlation-based querying, which contain high values in pixels that are members of the structure and low values in pixels that are not. Each of those anatomical images $\phi^m$ are represented as a vector of length $K \in \mathbb{N}_0$ where K denotes the total number of pixels in the image, or all of them combined as $$\{\phi^m \in \mathbb{R}_+^K\}_{m=1}^M$$

where $M \in \mathbb{N}$ is the total number of anatomical images. Note that the anatomical images are positive by construction since they represent membership to an anatomical structure. For the examples, this formulation can even be simplified to $\{\phi^m \in [0,1]^K\}_{m=1}^M$. Similarly, the ion image desired to decompose is described by a positive vector $q = (q_1, \ldots, q_K)^T \in \mathbb{R}_+^K$ of length K. Due to the IMS-atlas link, the anatomical images $\phi^1$ to $\phi^M$ contain the same number of pixels as the ion image q. The ion image q is also positive by construction since its pixels encode ion counts.

The algorithm now seeks the optimal (and smallest) combination of anatomical images that, when multiplied by their contribution coefficients, add up to the target ion image. It is this optimal profile of intensity contribution coefficients p that answers the anatomical decomposition question. Anatomical images, and thus structures, corresponding to high absolute coefficients are important for approximating the ion distribution of interest, and are, therefore, considered part of the anatomical interpretation of that ion image. Anatomical structures with low absolute coefficients are considered unrelated to the ion image of interest. The following linear model is adopted for any $k = 1, \ldots, K$ $$q_k = \sum_{m=1}^{M} \phi_k^m p_m + \varepsilon_k$$

where the coefficients $p = (p_1, \ldots, p_M) \in \mathbb{R}^M$ encode the assumption that the ion image is essentially a weighted sum of the anatomical images/structures, up to the residual $\varepsilon = (\varepsilon_1, \ldots, \varepsilon_K)^T \in \mathbb{R}^K$. The implementation uses a classical approach to approximate the desired linear coefficients, minimizing the squared norm of the residuals, or $$p^* = \arg\min_p \sqrt{\sum_{k=1}^{K}\left(\sum_{m=1}^{M}\phi_k^m p_m - q_k\right)^2}$$

This optimization problem considers the optimal contribution coefficients to be the ones that minimize the difference between the measured ion image and its approximation using anatomical patterns. However, since the anatomical structures are stored in the Allen Mouse Brain Atlas in the form of a hierarchical tree, many anatomical patterns are very similar to each other, exhibiting large overlap and often differing by only a small sub-area. In the current formulation, this could cause multiple similar structures to be selected, dividing that area's contribution among them. This could result in unnecessarily complex anatomical interpretations consisting of large numbers of structures. Instead, it is desired for the algorithm to select only the best fitting anatomical structures for its interpretation, disregarding similar but less optimal ones, and keeping the total number of anatomical structures in the interpretation to a minimum. To accomplish this, an L1 regularization term is introduced for an appropriate choice of $\gamma \geq 0$, turning the anatomical interpretation into $$p_\gamma^* = \arg\min_p \left[ \sqrt{\sum_{k=1}^{K} \left( \sum_{m=1}^{M} \phi_k^m p_m - q_k \right)^2} + \gamma \sum_{m=1}^{M} |p_m| \right]$$

Similar to the LASSO (R. J. R. Tibshirani, *Stat. Soc. Ser. B* 1996, 58:267-288) algorithm, the 1-norm makes the optimization problem pursue sparsity in the solution of coefficients. This can be interpreted as follows: if the optimization problem does not know which solution p* to prefer up to a numerical quantity, then choose the solution with the smallest 1-norm. Parameter γ regulates what is meant by such a numerical quantity: if γ is large, a sparse solution containing only a few significant anatomical contribution coefficients will be preferred over an exact least squares fit of the ion image, while the reverse holds true for when γ is small. In these case studies, γ=1 was set. Given the number of pixels versus the number of anatomical structures involved in these data sets, this setting ensures that approximation of the ion image is more important than sparsity in the anatomical interpretation, while the sparsity term does keep the anatomical explanation to a minimum if multiple valid interpretations exist.

Note that the coefficients are not constrained to positive values in this formulation. This allows the anatomical interpretation to say things like "the ion seems to be present in zone A plus zone B minus zone C." Although it will usually result in a more intricate interpretation using lots of little structures, if desired, it is possible to constrain the algorithm to only consider additive interpretation by setting a positivity constraint on the coefficients in the optimization problem.

The implementation uses CVX, a package for specifying and solving convex programs (M. Grant and S. Boyd, in *Recent Advances in Learning and Control*, V. Blondel, S. Boyd, H. Kimura, Eds., Springer-Verlag Limited, 2008, pp. 95-110; and M. Grant and S. Boyd, "CVX: MATLAB® Software for Disciplined Convex Programming," version 2.0 beta; 2012) to solve the optimization problem for each ion image desired to be interpreted. The method delivers an approximation of each ion image using anatomical patterns, and a set of coefficients that report which anatomical structures are involved. A nice feature of the method is that an anatomical contribution coefficient tends to be proportional to the ion intensity in that anatomical structure, inherently assigning a notion of importance to each anatomical zone involved.

Additional Correlation-based Querying Examples
Protein Case Study Examples

Figure 10:
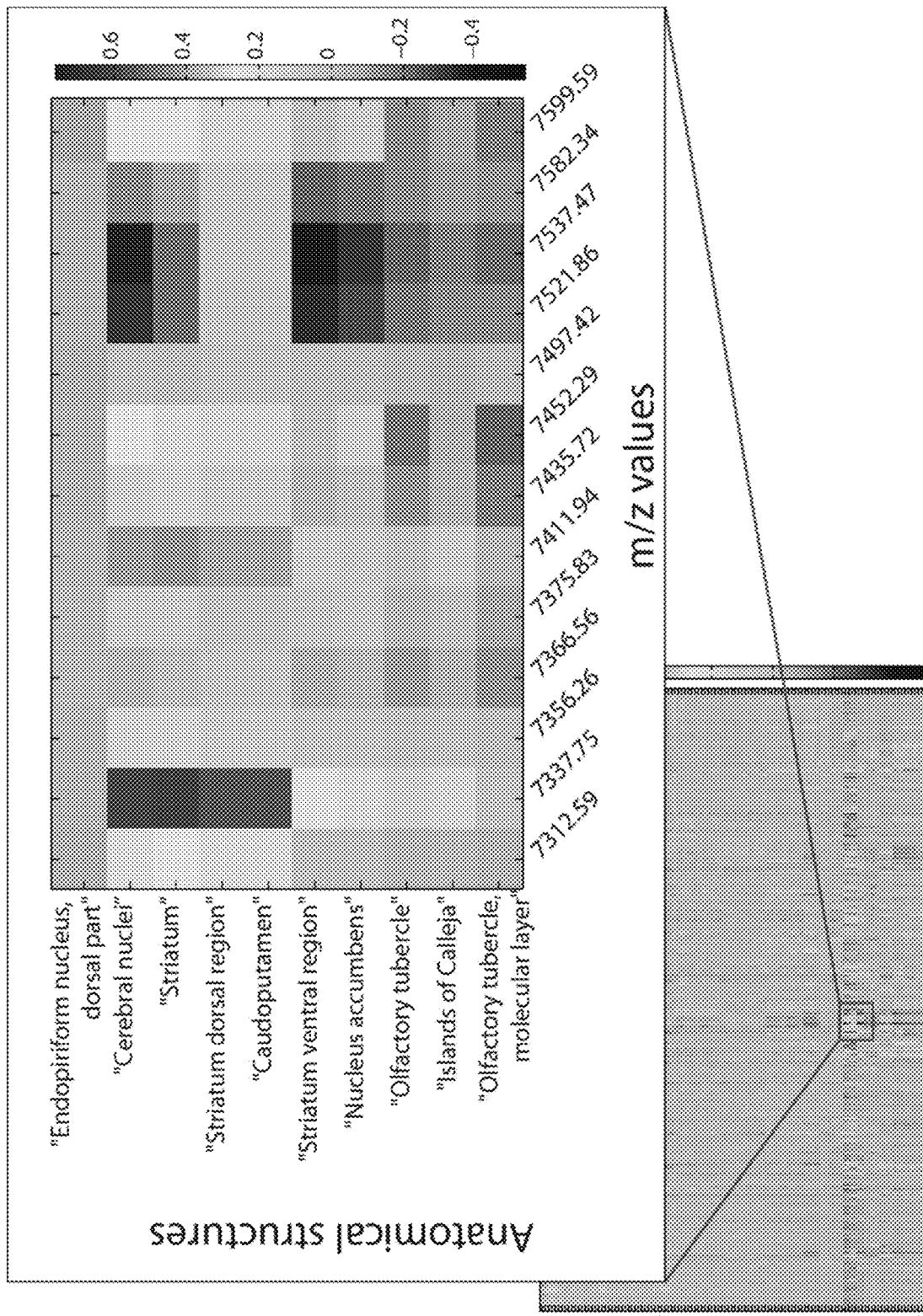
FIG. 10 illustrates the correlation table displaying spatial correlation between the anatomical structure images and ion images of the peak picked IMS protein data. The y-axis shows all the anatomical structures that are present at the depth in the brain that this IMS experiment was acquired at. The x-axis shows the peak picked m/z values. Red=high positive correlation, blue=high negative correlation, green=low correlation.

FIG. 10 shows the correlation table that results from the spatial correlation analysis between the anatomical structure images and the ion images of the peak picked IMS protein data. The y-axis shows all the anatomical structures at this depth of the brain (119 in total). The x-axis shows the peak picked m/z values. Anatomical structure/ion abundance combinations that have a high positive correlation (range ρ=[0.54–0.76]) are shown in dark red. Combinations that have a high negative correlation are indicated in dark blue. The other combinations exhibit low correlation ($|\rho|<0.15$).

Figure 11A:
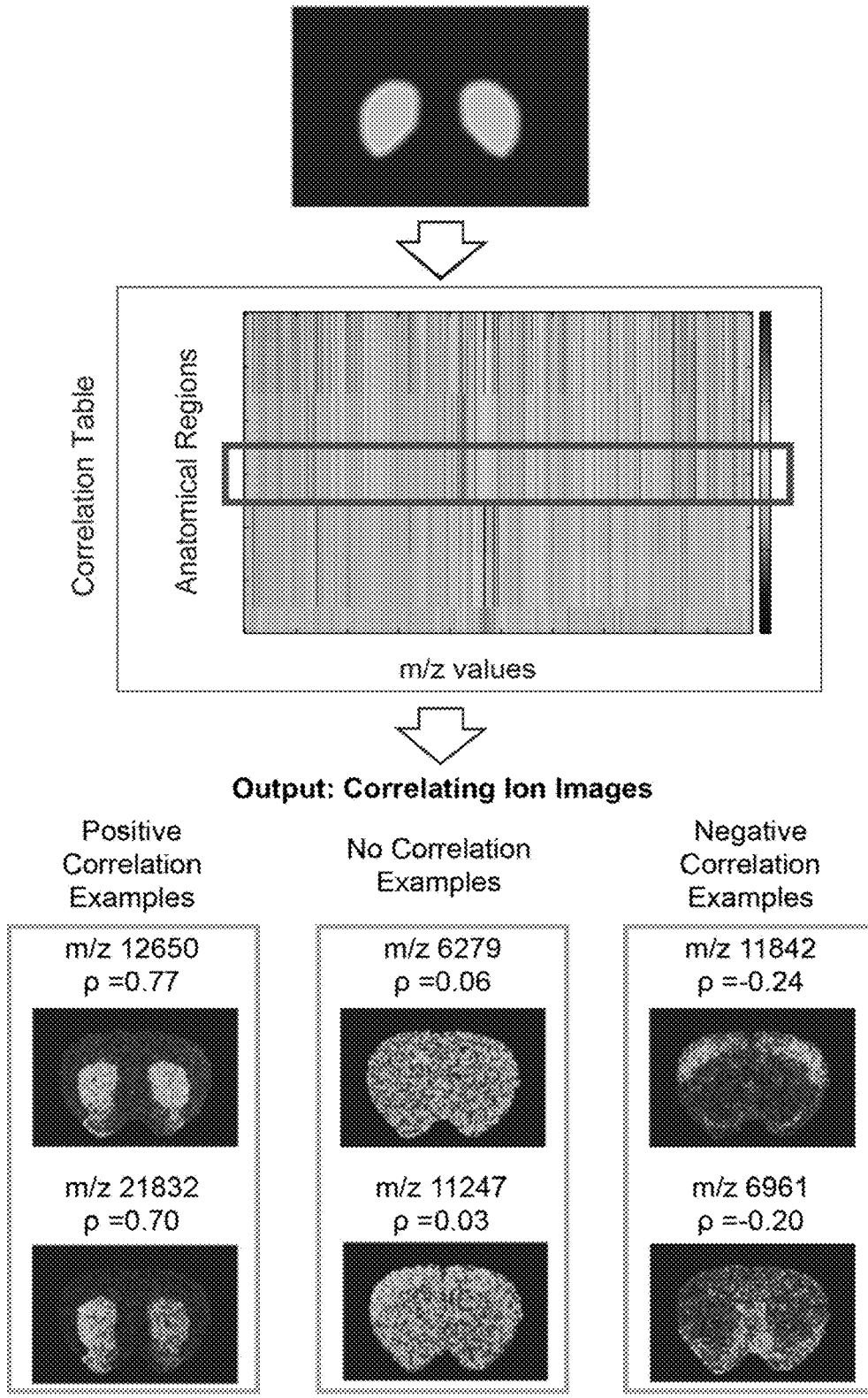

FIGS. 11A and 11B show an extended overview of the correlation-based queries presented in the main paper, including examples of negative and near-zero correlation. Ions m/z 6279 and m/z 11247 are two randomly selected ion image examples that exhibit low spatial correlation ($|\rho|<0.15$) with the caudoputamen, while ions m/z 11842 and m/z 6961 describe ion images that have high negative correlation with the target structure, exhibiting a clear absence of these ions therein. The anti-correlating examples demonstrate an interesting feature of the algorithm, which is that the anatomical query can be used not only to find ions specifically present in the anatomical structure of interest, but that it can also be used to search for ions specifically absent from the region of interest.

Figure 12:
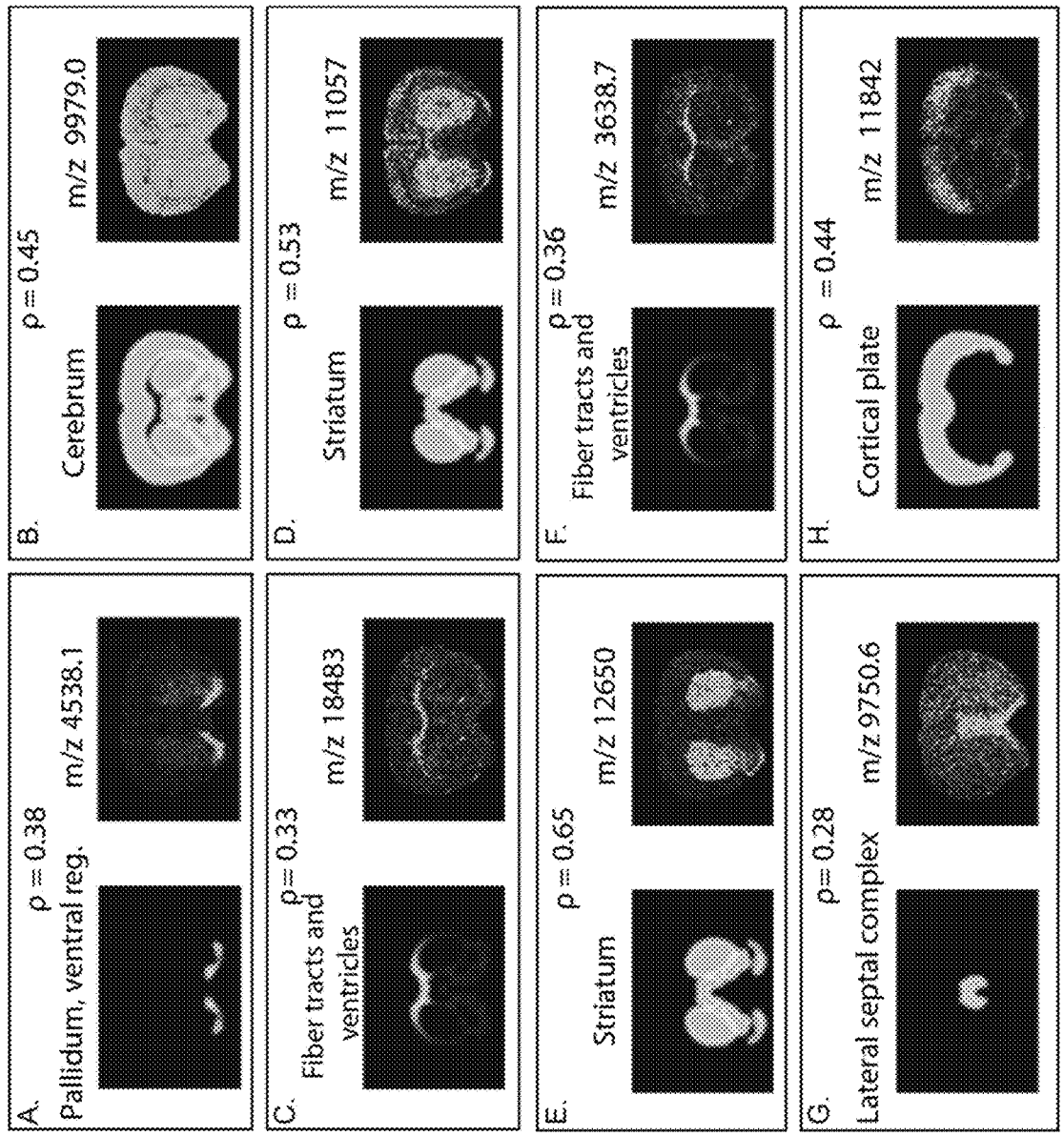
FIG. 12 depicts examples of positively correlating anatomical structure/ion image combinations. In each image, the anatomical structure image is shown on the left and the correlating ion image is shown on the right.

FIG. 12 shows several examples of positively correlated anatomical structure/ion image pairs in the protein data set. FIG. 12, Panel A, shows the correlation of the pallidum (ventral region) and m/z 4538, which is almost exclusively located in this area. The congruence of these relatively small areas demonstrates the accuracy of the registration. FIG. 12, Panel C, shows m/z 18483, which is well localized in the corpus callosum. Unfortunately, the corpus callosum is currently not available as a separate anatomical area in the Allen Mouse Brain Atlas, and is a substructure of the fiber tracts and ventricles, which shows high correlation with this ion in the current tissue slice. FIG. 12, Panel G, shows the correlation between the lateral septal complex and m/z 9751. From this image, it can be seen that m/z 9751 is not exclusively located in the septal complex, but rather in multiple anatomical structures. This example emphasizes the need for a multi-membership approach.

Lipid Case Study Examples

Figure 13:
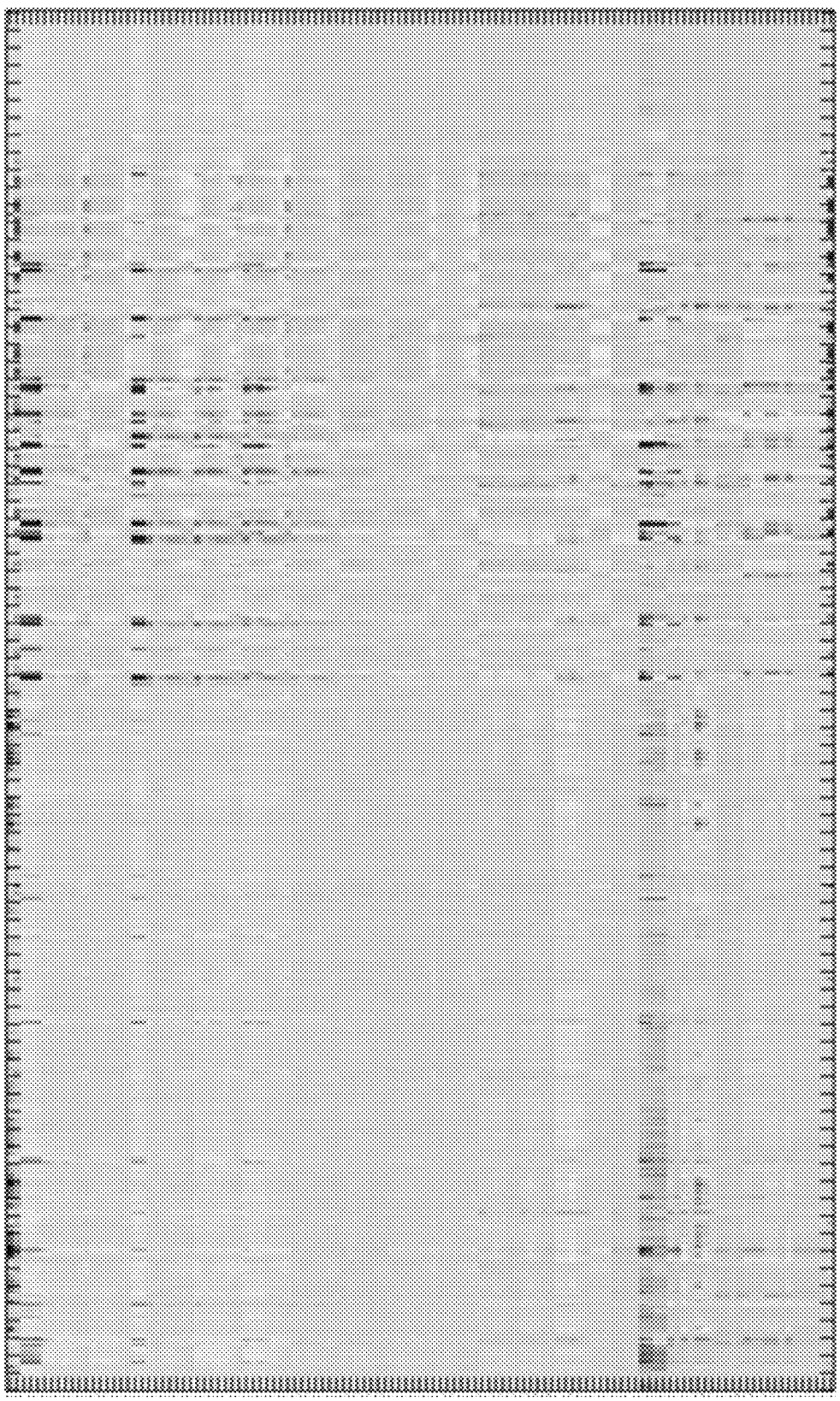
FIG. 13 depicts the correlation table resulting from the spatial correlation analysis between the anatomical structure images and the ion images of the peak-picked IMS lipid data. The y-axis shows all the anatomical structures that are present in the tissue slice. The x-axis shows the peak-picked m/z values. Red=high positive correlation, blue=high negative correlation, and green=low correlation.
Figure 14:
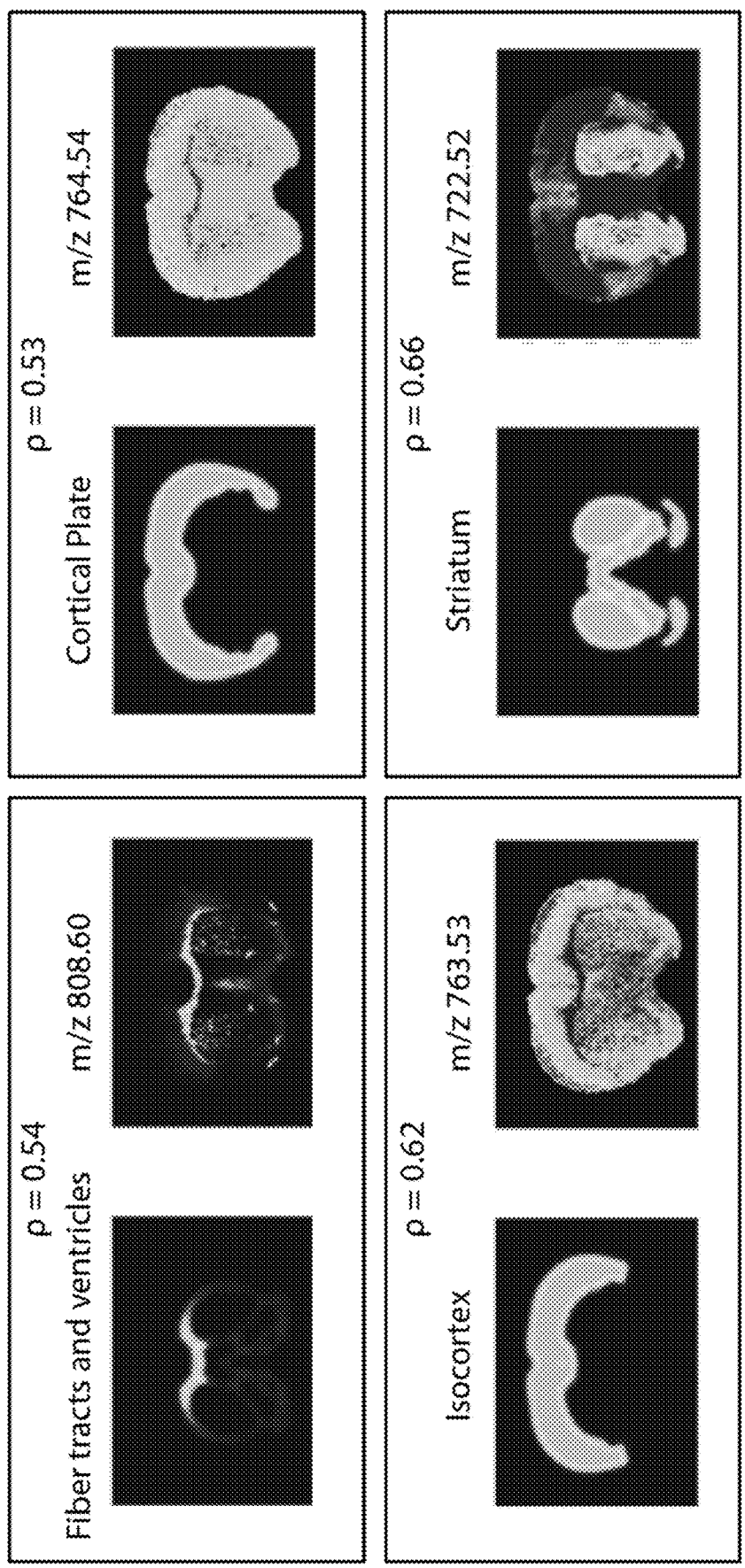
FIG. 14 depicts examples of several positively correlating lipid ion images. In each image, the anatomical structure image is shown on the left and the correlating ion image is shown on the right.

FIG. 13 shows the correlation table for the lipid data (negative mode) with the atlas data. It shows areas of high positive, high negative, and low correlation. FIG. 14 displays several examples of anatomical structure/ion abundance combinations with high positive correlation.

Additional Automated Anatomical Interpretation Examples

Figure 15A:
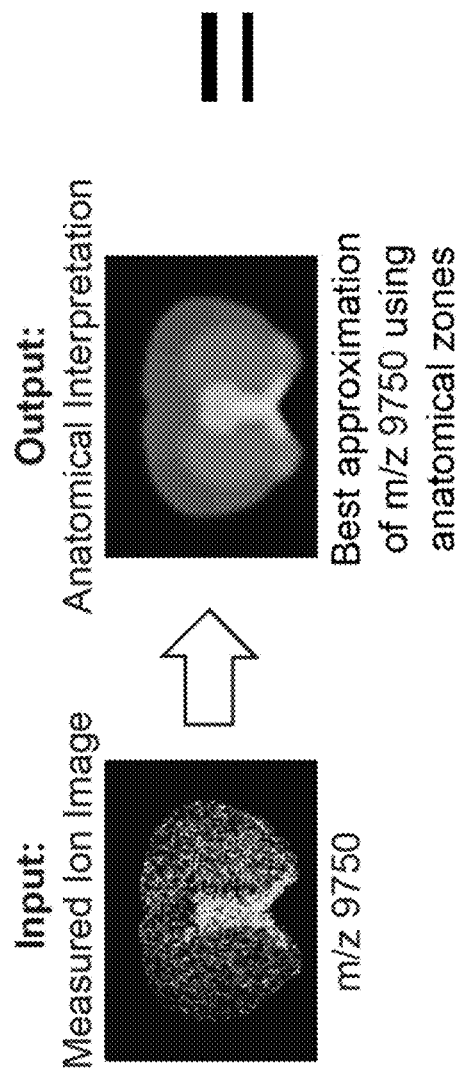
FIGS. 15A and 15B demonstrate examples of automated anatomical interpretation applied to the protein-focused IMS case study. When an ion image is given as input (top-left), the interpretation method provides an optimal anatomical explanation for the observed ion pattern (bottom), using the library of provided anatomical structures. Specifically, the ion intensity pattern is decomposed without user intervention into an optimal combination of contributing anatomical structures from the atlas. The interpretation method provides (i) the closest approximation of the measured ion image using atlas structures (top-middle), and (ii) a linear combination of the contributing anatomical structures, specifying name, reference location, and contributing intensity or weight in the interpretation (bottom). This visualization shows for each ion image the most contributing anatomical zones, preceded by their weight, which signifies their relative importance in the overall anatomical interpretation. Negative weights indicate a relative decrease of the ion in those areas.
Figure 15A:
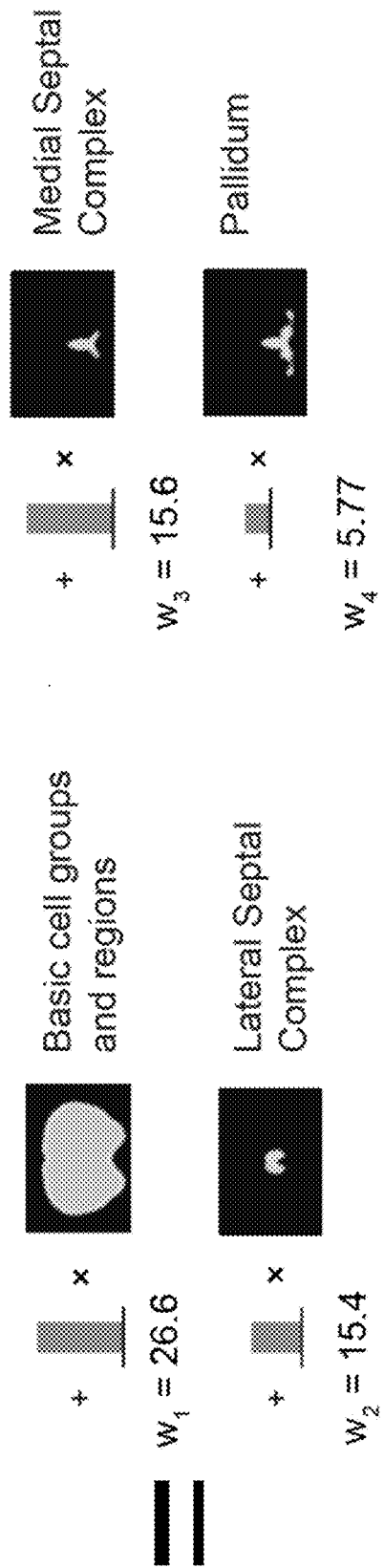
Figure 15B:

Examples of automated anatomical interpretation applied to the protein-focused IMS case study are demonstrated in FIGS. 15A and 15B. When an ion image is given as input (top-left), the interpretation method provides an optimal anatomical explanation for the observed ion pattern (bottom), using the library of provided anatomical structures. Specifically, the ion intensity pattern is decomposed without user intervention into an optimal combination of contributing anatomical structures from the atlas. The interpretation method provides (i) the closest approximation of the measured ion image using atlas structures (top-middle), and (ii) a linear combination of the contributing anatomical structures, specifying name, reference location, and contributing intensity or weight in the interpretation (bottom). This visualization shows for each ion image the most contributing anatomical zones, preceded by their weight, which signifies their relative importance in the overall anatomical interpretation. Negative weights indicate a relative decrease of the ion in those areas. (FIG. 15A) Ion m/z 9750 is highly expressed in the medial septal complex and the lateral septal complex. (FIG. 15B) Ion m/z 11312 is specifically absent in the pallidum. This is indicated by its negative contribution coefficient or weight, and is also clearly visible in the ion image. The empirical ion distributions show good congruence with the boundaries of the anatomical structures defined in the atlas, indicating good spatial mapping between the data sources, and strong biological signals in IMS measurements also in the protein-focused case study.

Sparsity in Automated Anatomical Interpretation

From the equation of the convex optimization formulation, it is clear that γ is the only parameter in the anatomical interpretation model. Parameter γ controls how much emphasis is placed on the approximation of the measured ion pattern versus the simplicity (sparsity) of the anatomical explanation. This parameter functions essentially as a dial that allows the user to choose whether a broad overview anatomical interpretation is provided, capturing the major anatomical trends of the ion pattern, or whether a more detailed interpretation is returned that breaks those larger anatomical zones into more precise sub-zones. The $\gamma$ dial of the algorithm has a range from 0% sparsity (closest approximation, most detailed anatomical interpretation) to 100% sparsity (approximation of only the broader trends, less complex anatomical interpretation).

Which level of interpretation complexity is preferable is dependent on the particular purpose that the anatomical interpretation will serve. If it is meant for human consumption, it is often not preferable to have a very intricate interpretation using twenty or more anatomical labels. Instead, a medical professional typically wants a broad breakdown into the five or six major anatomical zones involved, unless they have a particular case-study reason to request otherwise. If the interpretation is to be used as annotations for a computational follow-up (e.g., classification or clustering that includes anatomical labels as extra information), there is little reason not to go for highly detailed interpretations since the computer will easily handle these. Regardless of the particular use case, the same model is capable of delivering these interpretations.

Given these examples, it is clear that there is not one particular "best" value for $\gamma$, since the best value for one application is not necessarily the best for another. Therefore, it is preferred to provide the user access to this dial so that he/she may determine directly which sort of interpretation complexity is desired for a particular use case. However, note that the ability to request different levels of complexity in an anatomical interpretation does not jeopardize the analytical accuracy of the interpretation. This is because a less complex anatomical interpretation (higher $\gamma$) is directly related to a more complex interpretation (lower $\gamma$) in the sense that large anatomical zones are simply broken down into subdivisions that allow for a more granular description. As such, changing $\gamma$ only changes the complexity of the list of anatomical labels involved, it does not change which anatomical space is tied to the ion pattern.

For the proof-of-concepts and introduction of the multivariate model and algorithm in this paper, $\gamma$ has been set to one since it allows demonstration of the capabilities of the algorithm sufficiently to make the point. Due to the dimensions of the data sets (and, in fact, most MALDI IMS data sets), a $\gamma$ of one ensures that the sparsity is secondary to the approximation. It basically ensures that only if two equally close anatomical interpretations are available, the sparser one wins.

Another note is that due to the speed and parallelism of the algorithm, it is perfectly feasible to explore multiple $\gamma$s and determine the "optimal" $\gamma$ for a particular data set and application. In fact, this is the common approach to setting such parameters in the optimization literature. An example of this is the use of "optimal trade-off curves" in Boyd and Vandenberghe (S. P. Boyd and L. Vandenberghe, Convex Optimization, Cambridge University Press, Cambridge, UK, 2004).

With regard to comparing anatomical interpretations between different ion images, it is also good to note that the $\gamma$ parameter is equal across all the hundreds of ion images within an IMS experiment. This makes these interpretations directly comparable regardless of the particular value of $\gamma$, an advantage not available from human interpretation (where the level of interpretation complexity is a free-floating variable, subjectively controlled at best).

Automated Anatomical Interpretation and the Structure of Annotation Labels

With the previous section discussing the role of sparsity in the anatomical interpretation, it is valuable to also have a closer look at the structure of the AMBA and specifically how the structure of the annotations in the AMBA pertains to the interpretation. As mentioned earlier, the AMBA is organized in a hierarchical fashion. This annotation structure sometimes does not accurately reflect the region subdivisions encountered in nature, and since the anatomical interpretation method can only work with the anatomical annotations provided by the atlas, an optimal interpretation sometimes returns more anatomical zones than would be expected at first sight.

Figure 16:
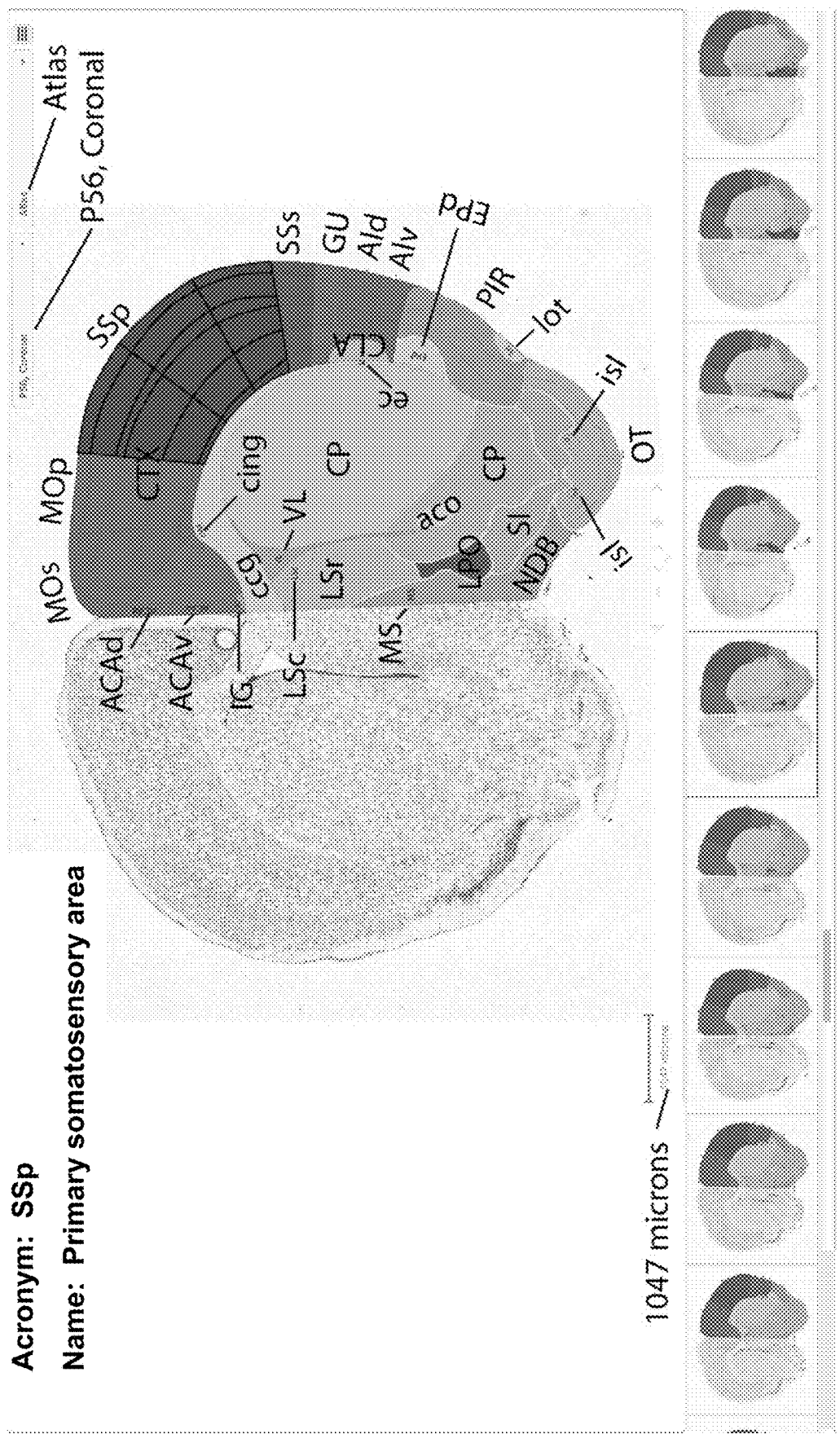
FIG. 16 depicts the primary somatosensory area.
Figure 17:
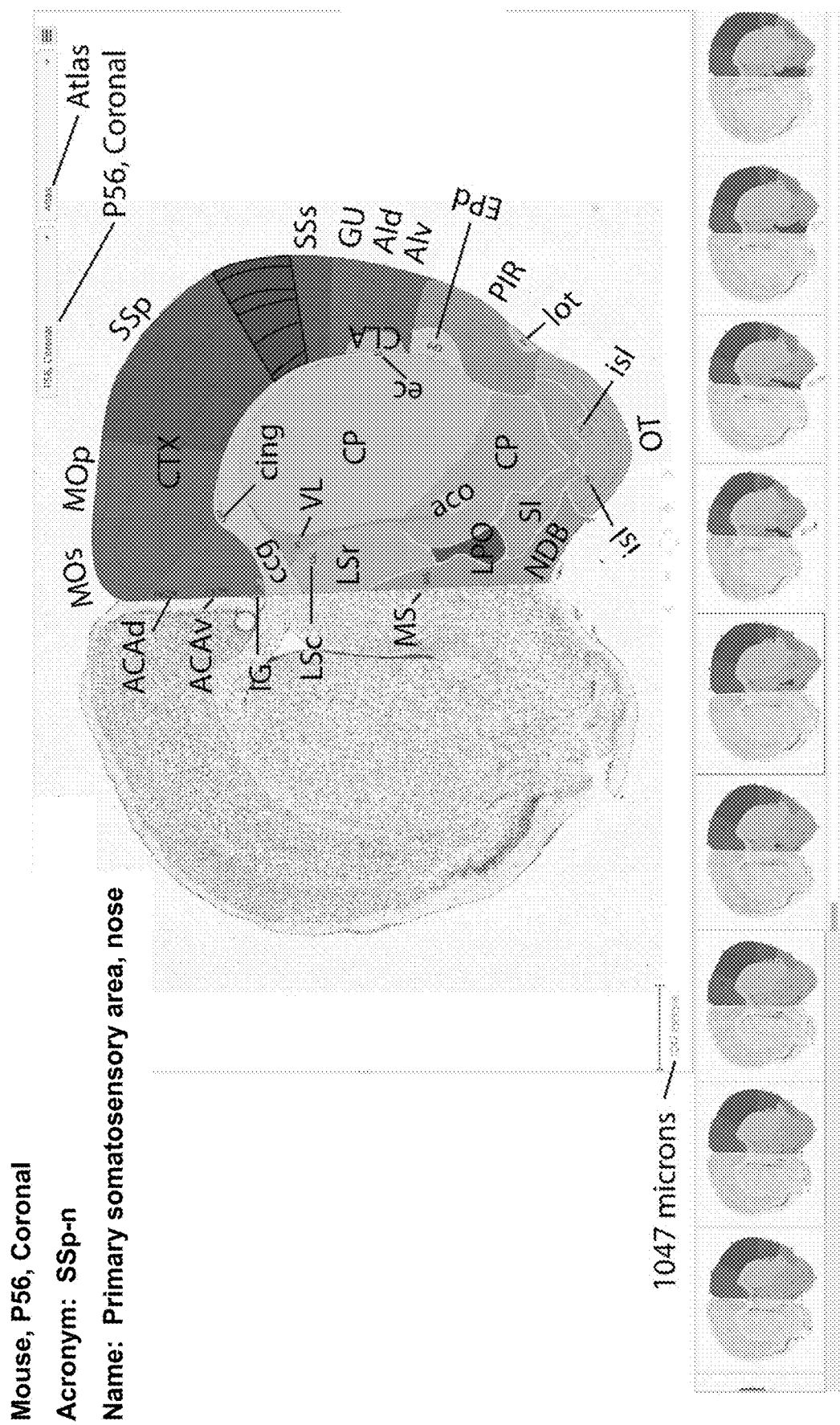
FIG. 17 depicts the primary somatosensory area, nose (a radial sub-area of the "Primary somatosensory area" parent shown in the previous figure).
Figure 18:
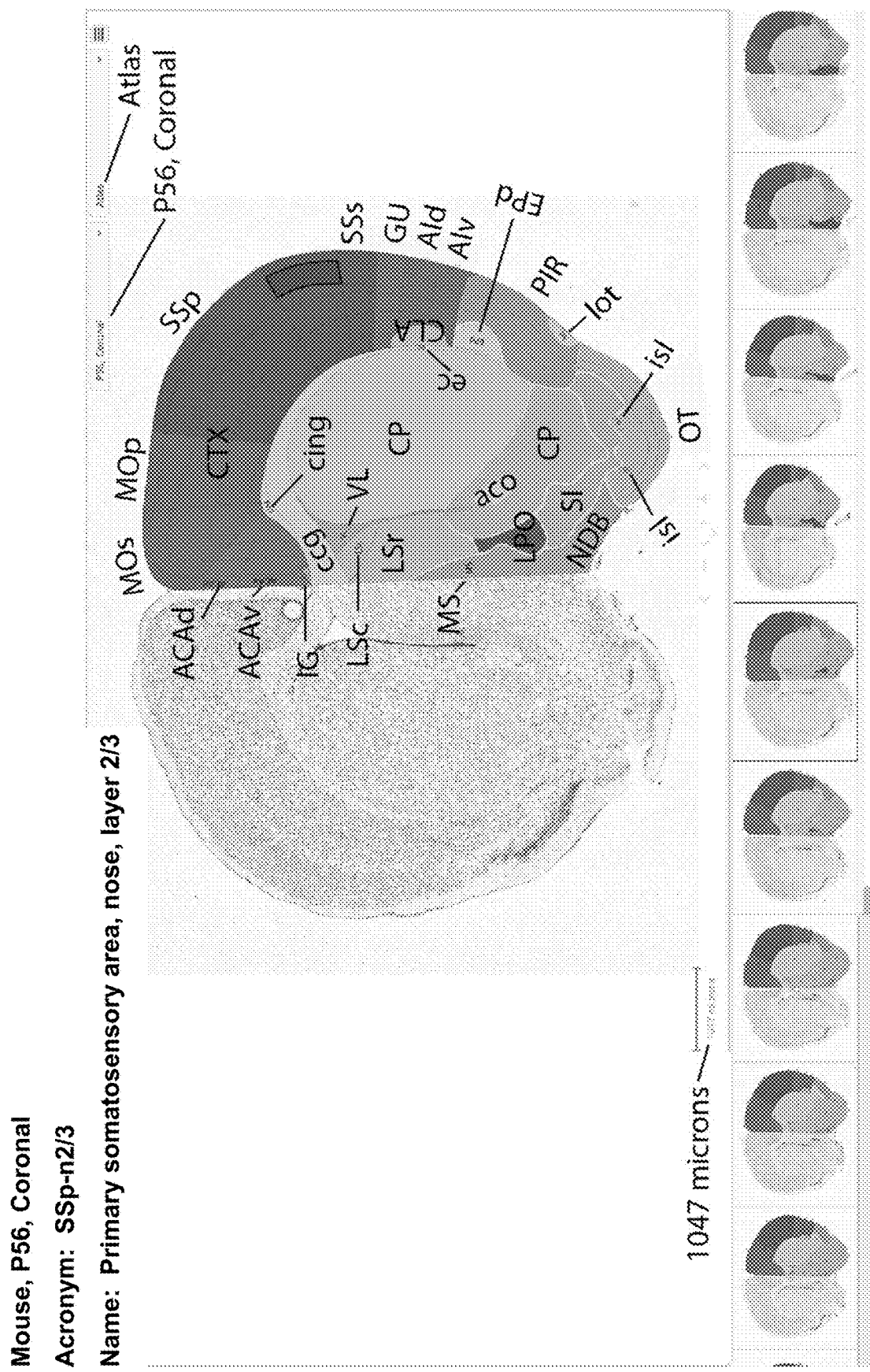
FIG. 18 depicts the primary somatosensory area, nose, layer 2/3 (a concentric sub-area within a radial sub-area of the "Primary somatosensory area").

Below, this hierarchical subdivision of the atlas is illustrated with several screenshots (FIGS. 16-18) taken from the interactive atlas viewer available on the AMBA website (on the World Wide Web at atlas.brain-map.org/). As an example, these figures show that the isocortex is hierarchically first sub-divided into "radial" sections, and only at a deeper level do these radial structures get split further into concentric sub-divisions. The hierarchical annotation structure prevents the AMBA from providing a single named annotation that represents all concentric regions of the isocortex as one, regardless of the radial locations involved. As such, the automated anatomical interpretation method does not have a concentric radial-independent sub-division pattern available in its vocabulary of anatomical structures, and can only represent such a structure as a combination of concentric sub-divisions of radial sub-divisions. Studies such as Ko et al. (Y. Ko, S. A. Ament, J. A. Eddy, J. Caballero, J. C. Earls, L. Hood, and N. D. Price, *Proc. Natl. Acad. Sci. U.S.A.* 2013, 110:3095-100), on the other hand show, that in biology, a concentric radial-independent division exists in the mouse brain, and such a division can also be seen in ion image m/z 7841 of FIG. 4B (the intensity of the ion is higher in the outer-most concentric layer of the brain).

This example shows that ions specific to a concentric layer of the brain, but not specific to a radial sub-division of that brain, are difficult to approximate using the AMBA. The AMBA essentially forces a non-hierarchical anatomy structure into a hierarchical representation, and, as a result, loses some of the parent-daughter region relationships. This is an example of a biological region that can be easily recognized, but is not explicitly represented in the atlas and, therefore, hard to label with a single name. This sort of biological region cannot be captured adequately using a univariate approach, and this example further illustrates the need for multivariate interpretation algorithms capable of handling multi-membership properly.

With a multi-membership-aware interpretation method, such as the one developed in this paper, there are currently two ways of handling these types of regions:

1. Complement the AMBA with additional patterns that group sub-patterns in different combinations (could be done exhaustively). For the proof-of-concept demonstrations, using the AMBA as-is was desired, so this option is not explicitly discussed here.
2. Use the regularization parameter $\gamma$ of the method as a dial that can be set to "make the interpretation as specific as possible" (which would grab the cortical layers specifically) or "make the interpretation high-level" (which would grab the overall encompassing region), as discussed in the previous section.

It is valuable to note that due to the speed and parallelism of the interpretation method, it is perfectly feasible to collect interpretations using multiple regularization parameter values (from global all the way to very specific). It would just require storing more anatomical membership tables, but would be a means of "auto-discovering" the sub-categorizations that have been lost due to the hierarchical structure of the AMBA.

In short, although the hierarchical structure of the AMBA is a feature external to the method, the interpretation method provides the parameter to either ask for an interpretation of a particular kind (from global to more specific), or the speed and performance to interrogate the same IMS measurement from a bunch of different viewpoints and collect the data for assessment in a later phase.

Automated Anatomical Interpretation of Non-Conforming Ion Images

This section describes how the automated anatomical interpretation method handles ion images that do not conform to anatomy, or that do not exhibit uniform intensity distribution within known anatomical structures.

The interpretation method developed finds for each empirically acquired ion image in an IMS experiment, the best possible approximation using only the vocabulary of reference anatomy patterns in the atlas. This means that for each ion image in the IMS experiment, there is a measure of "distance" between the measured ion image and its approximation using anatomy from the atlas. This distance is expressed in terms of ion counts, and is implicitly provided by our algorithm for each individual ion species in the study. These distances can be directly compared across all ion images in an IMS experiment.

Two possible scenarios unfold:

1. Small Distance Between Ion Image and Anatomical Approximation:

The spatial distribution of this ion can be well approximated using the atlas⇒ strong automated anatomical interpretation of this ion species is possible using the standard anatomy provided by the atlas.

2. Large Distance Between Ion Image and Anatomical Approximation:

The spatial distribution of this ion cannot be well approximated using the atlas⇒ the anatomy atlas does not provide the tools to adequately describe the spatial distribution of this ion species.

In other words, the automated anatomical interpretation algorithm can be used as an automated filter that separates ion species that conform to known anatomy from those ion species that deviate from known anatomy.

This means that the algorithm described here does not only provide a means for automated anatomical interpretation of ion images, but implicitly also provides a means of discovering which ion species deviate substantially from known histology. As such, the method can be used to automatically detect which ion species are distributed into subdivisions, subareas, or gradients within anatomical regions that, according to the atlas, are supposed to be homogeneous. Essentially, the method gives an automated anatomical interpretation for those ions that can be explained using the atlas and, additionally, highlights those ions in which the IMS measurements show patterns that cannot be explained by known anatomy (e.g., disease-specific chemical patterns, previously unknown chemical subdivisions within tissue areas, etc.).

Results & Discussion

The developed methods are demonstrated, both in a protein-focused and a lipid-focused case study of coronal mouse brain sections, illustrating the potential of incorporating anatomical information into IMS analysis.

Results on Registration of the Data Sources.

Figure 3:
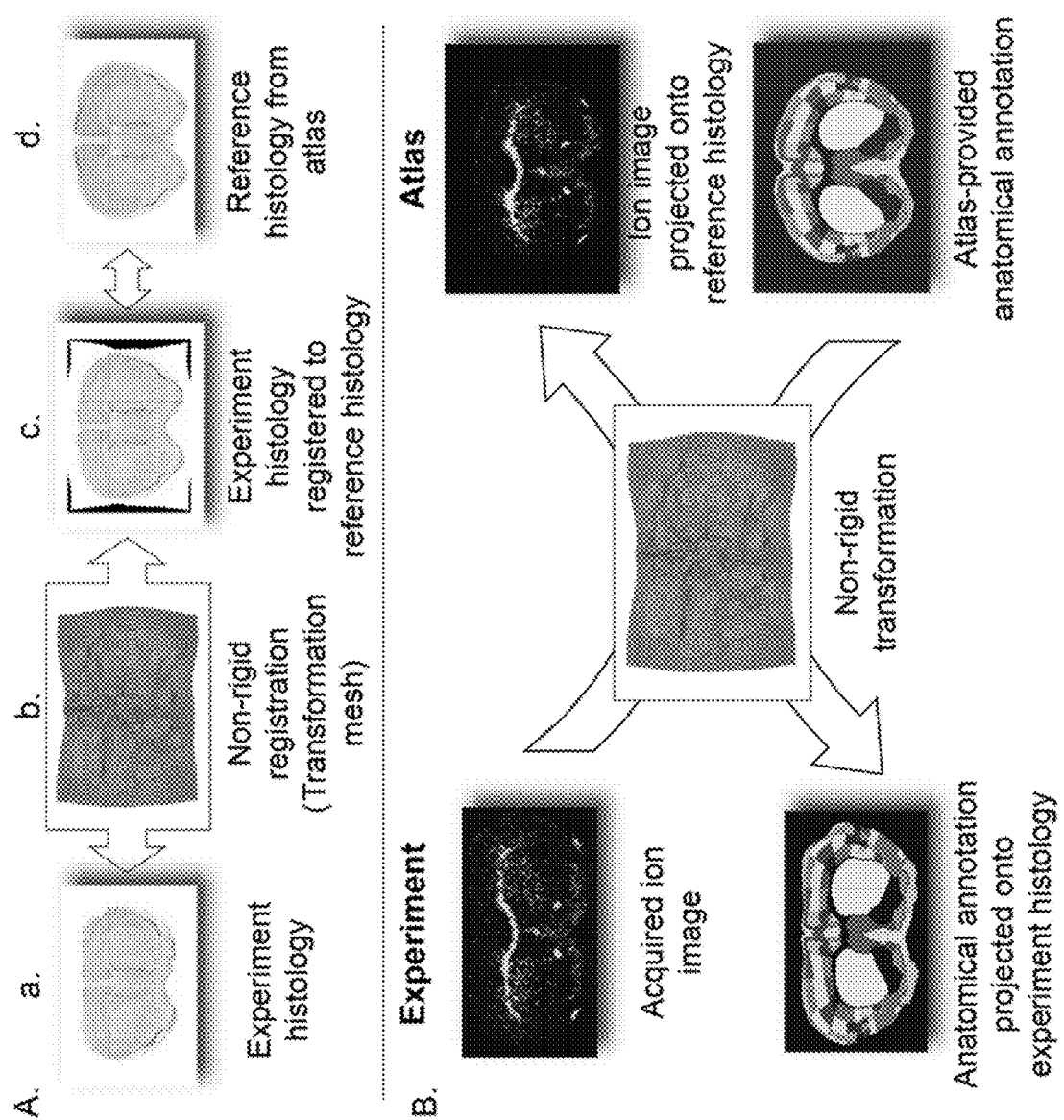
FIG. 3 provides a schematic diagram showing an overview of registration results. (Panel A) Non-rigid registration of the experiment histology onto the reference histology from the atlas. Despite the large initial deformation of the experiment histology (a), the non-rigid transformation (b) successfully compensates and registers (c) onto the reference histology (d). (Panel B) The non-rigid registration enables traversal from the coordinate system of one data source to the other: the acquired ion image can be projected onto the reference histology for direct comparison to the anatomical annotations. Inversely, the anatomical annotations, provided by the atlas, can be projected onto the experiment histology to provide anatomical guidance within the sectioned tissue.

A non-rigid registration algorithm is used to register the experiment histology (FIG. 3, Panel A, section a.) to the atlas reference histology (FIG. 3, Panel A, section d.). Although the experiment histology is strongly deformed compared to the reference histology, the registration results (FIG. 3, Panel A, section c.) demonstrate that the non-rigid registration can deal well with these soft-tissue deformations. The FFD (Free-Form Deformation) mesh of control points (FIG. 3, Panel A, section b.) that constitutes the transformation between the two images, shows how the experiment histology image is "warped" to register to the atlas histology. By using an FFD transformation mesh, it is ensured that neighboring IMS pixels remain neighbors and prevent excessive distortion of the original data.

FIG. 3, Panel B shows how the transformation established by the non-rigid registration process is used to transform and project data from one data source to the other and vice versa. The non-rigid transformation is reversible (up to a rounding error) and there is a one-to-one relationship between locations in "IMS space" and locations in "atlas space." This means that projection of IMS data onto the reference histology is enabled (FIG. 3, Panel B top right). Such a projection effectively brings empirical MS measurements acquired from imperfectly sectioned or deformed tissue into the reference shape of the mouse brain, and it directly links these observations to reference atlas annotations. Similarly, projection of the atlas annotations onto the experiment histology is also enabled (FIG. 3, Panel B lower left). This direction of projection draws annotations that are typically defined in an ideally shaped version of the mouse brain into the practical tissue sample that was sectioned. Casting the anatomy information to the experiment histology also enables quick visual verification of the correctness of the projection since the neighborhood structure of the different subareas should be retained regardless of tissue deformation.

Results on Querying the Correlation Between Anatomy and Ions.

Once registration of the two data sources is complete, a correlation table was constructed by calculating the spatial correlation between the anatomical structure images and the ion images of the peak picked IMS protein data. The correlation table (available in this application) allows two types of queries: anatomical queries and ion queries.

Anatomical Query.

Figure 4A:
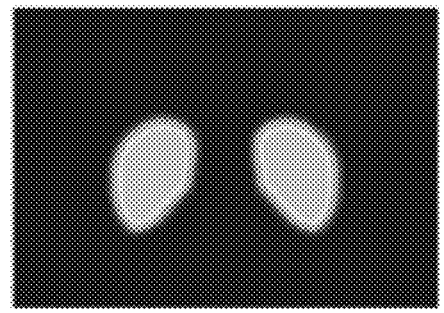
FIGS. 4A and 4B provide schematic diagrams showing (FIG. 4A) an example of an anatomical query, finding ions specific to the caudoputamen. The anatomical structure image of the caudoputamen is given as input and the correlation table returns the spatial correlation to this structure for each ion image. Two examples of ion images that positively correlate with the target anatomical structure are displayed.
Figure 4A:
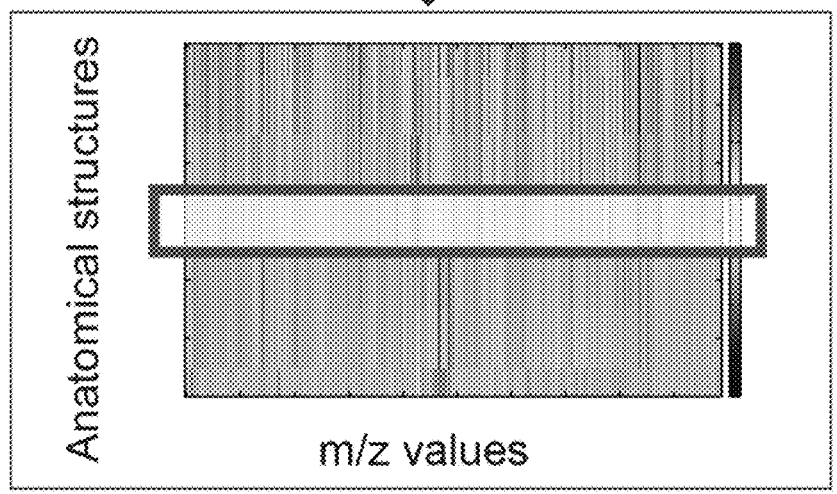
Figure 4A:
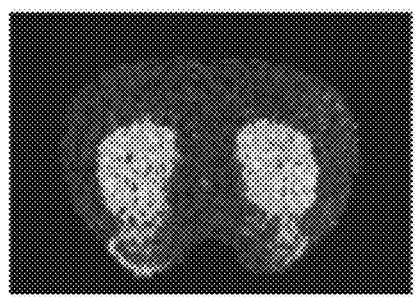
Figure 4A:
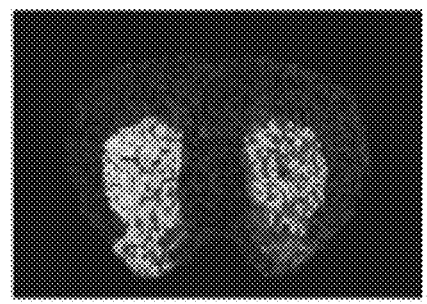

The anatomical query provides an answer to the question "Which ions are specific to anatomical region X?". To demonstrate, the caudoputamen was used as an example anatomical structure. FIG. 4A shows the input, the anatomical structure image of the caudoputamen, and displays the part of the correlation table that pertains to this structure, highlighting its spatial correlation to the various ion images. Ions m/z 12650 ($\rho=0.77$) and m/z 21832 ($\rho=0.70$) are two examples of ion images that exhibit high positive correlation in this case. These ions show a clear spatial overlap with the anatomical structure image of the caudoputamen, and are almost exclusively located therein.

Ion Query.

Figure 4B:
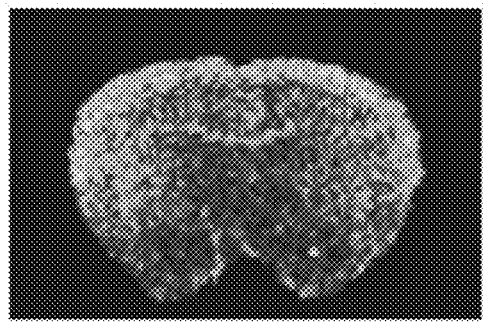
Figure 4B:
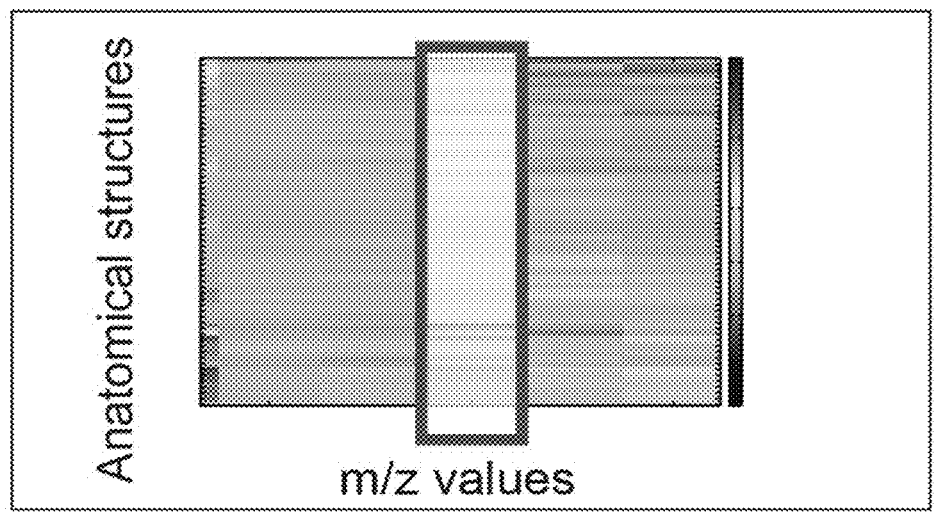
Figure 4B:
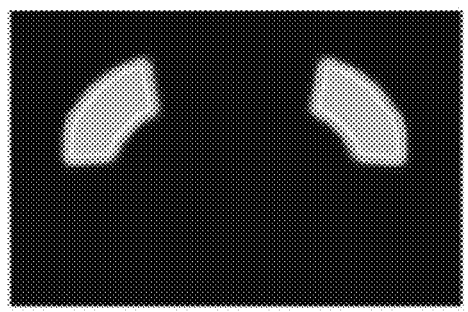
Figure 4B:

The ion query provides an answer to the question "In which anatomical regions is ion Y located?". To demonstrate this query, the ion image for m/z 7841 was used as an example. FIG. 4B shows the ion image as input and, analogous to the anatomical query, it displays the part of the correlation table that pertains to this ion. The isocortex ($\rho=0.40$) and the somatosensory areas ($\rho=0.36$), which are substructures of the isocortex, are two examples of anatomical structures that exhibit high positive correlation with m/z 7841. Additional examples are provided in this application.

Correlation-based queries can deliver fast insight into relationships between ions and anatomical structures, but have several disadvantages. First, it is difficult to define a generic threshold to determine when these correlations become significant. Second, since several thousands of correlations are being calculated in parallel, the multiple testing problem needs to be considered when drawing conclusions from these results. However, the most important roadblock for using correlation toward automated anatomical interpretation is the concept of "multi-membership." Correlation considers only the relationship between a single anatomical structure and a single ion. An ion that appears in several anatomical structures simultaneously will exhibit a relatively low correlation to each of the individual anatomical structures that it is a member of. Such an ion will not give a strong signal in the correlation table, and could go undetected as a result. In these multi-membership situations, which are quite common in most biological tissue types, correlation-based querying falls short and is not capable of dealing with the complexities of the biology. In fact, in such complex cases, any univariate querying strategy will provide skewed results.

Figure 5A:
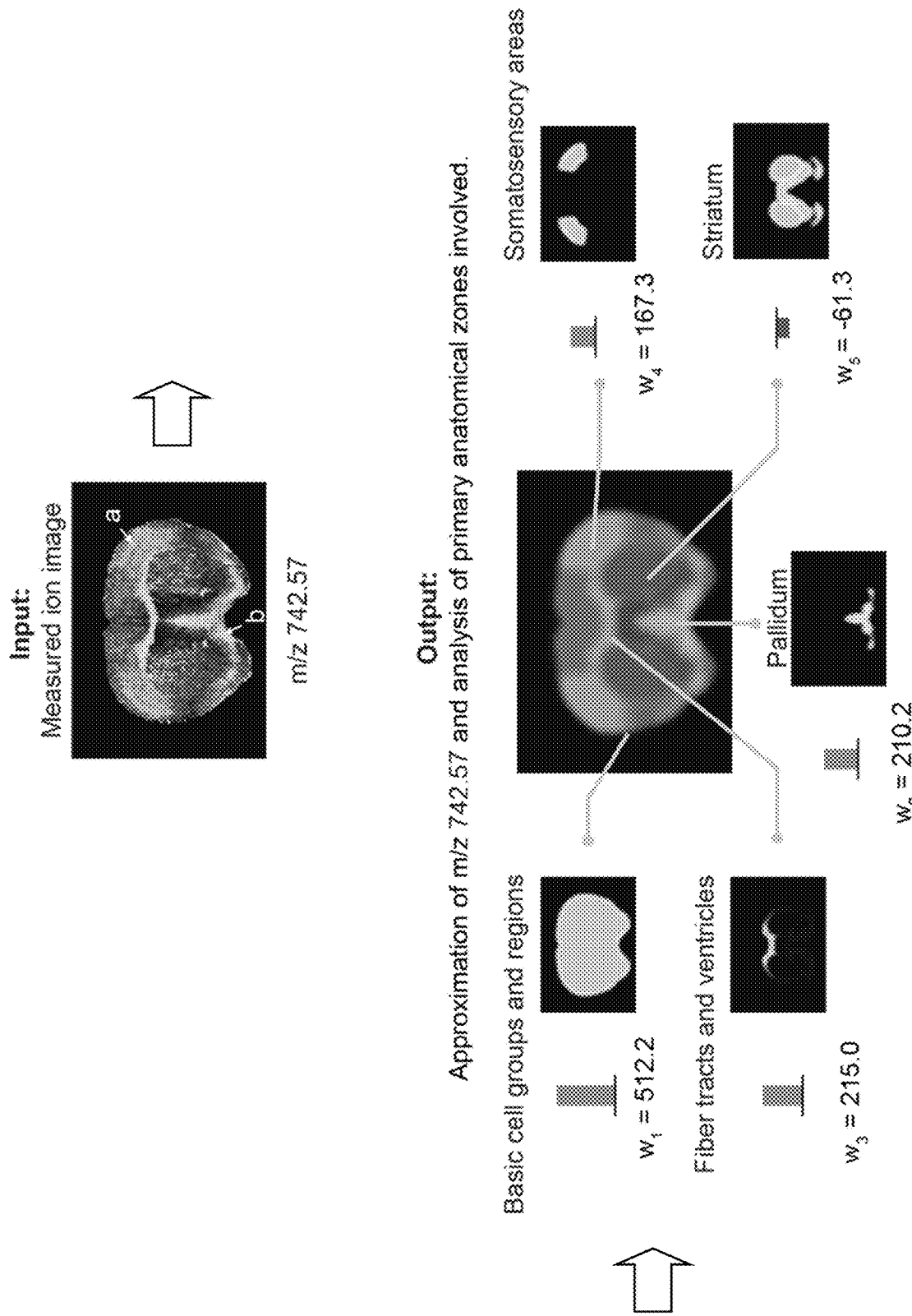
FIGS. 5A and 5B are schematic diagrams showing examples of automated anatomical interpretation. When an ion image is given as input (top), the interpretation method provides an optimal anatomical explanation for the observed ion pattern (bottom), using the library of provided anatomical structures. Specifically, the ion intensity pattern is decomposed without user intervention into an optimal combination of contributing anatomical structures from the atlas. The interpretation method provides (i) the closest approximation of the measured ion image using atlas structures (bottom, middle), and (ii) an overview of the contributing anatomical structures, specifying name, reference location, and contributing intensity or weight in the interpretation (bottom, outer ring). This visualization delivers quick insight into the major anatomical zones associated with an ion image, while also providing a notion of the relative contributions of each underlying structure involved. Negative weights indicate a relative decrease of the ion in those areas.
Figure 5B:
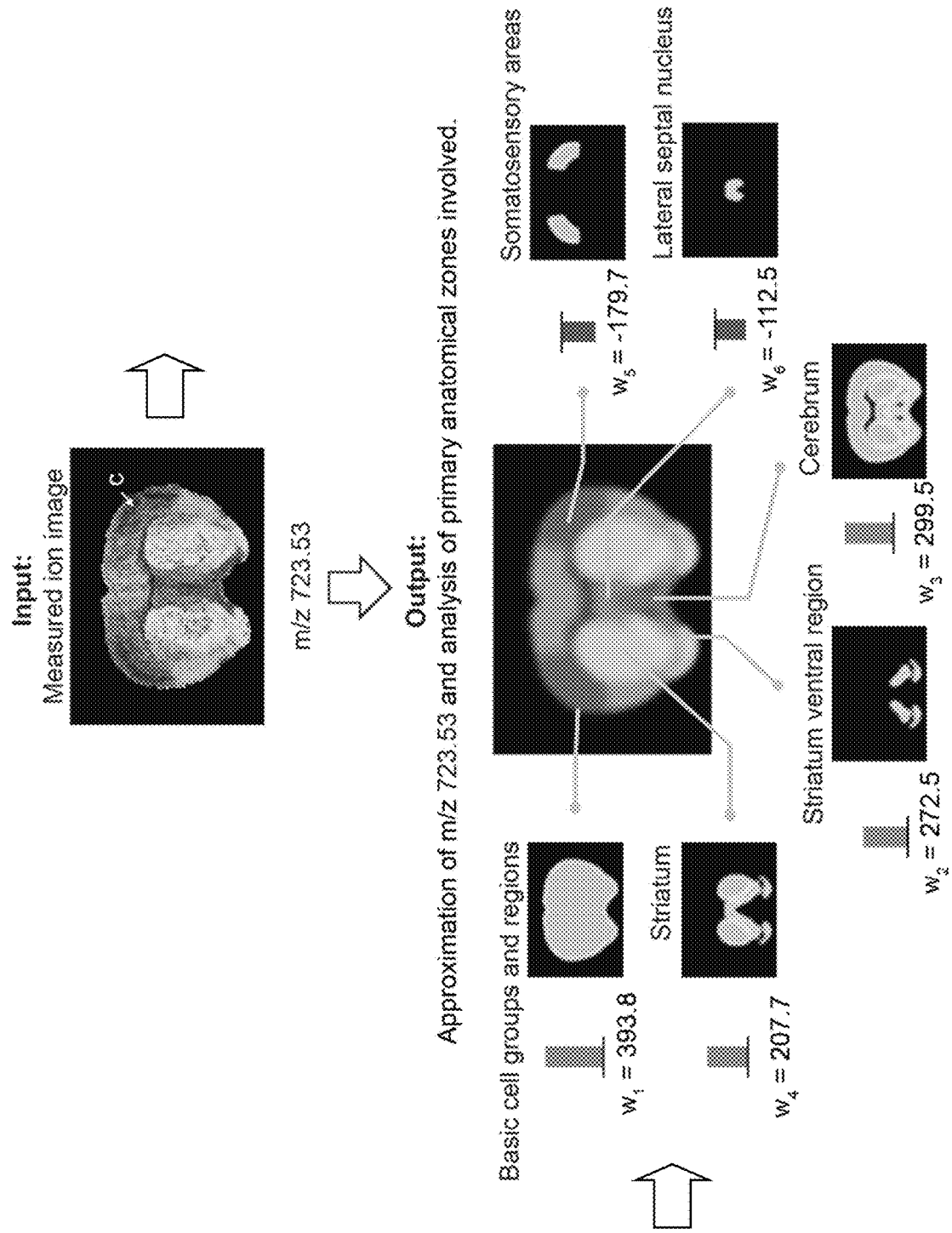

Examples of automated anatomical interpretation are provided in FIGS. 5A and 5B. When an ion image is given as input (top), the interpretation method provides an optimal anatomical explanation for the observed ion pattern (bottom), using the library of provided anatomical structures. Specifically, the ion intensity pattern is decomposed without user intervention into an optimal combination of contributing anatomical structures from the atlas. The interpretation method provides (i) the closest approximation of the measured ion image using atlas structures (bottom, middle), and (ii) an overview of the contributing anatomical structures, specifying name, reference location, and contributing intensity or weight in the interpretation (bottom, outer ring). This visualization delivers quick insight into the major anatomical zones associated with an ion image, while also providing a notion of the relative contributions of each underlying structure involved. Negative weights indicate a relative decrease of the ion in those areas. In FIG. 5A, ion m/z 742.57 is highly expressed in the somatosensory areas, the fiber tracts, and the pallidum. In FIG. 5B, ion m/z 723.53 shows a decrease specifically in the somatosensory areas, as indicated by the negative weight. The empirical ion distributions show good congruence with the boundaries of the anatomical structures defined in the atlas, indicating good spatial mapping between the data sources, and strong biological signals in the IMS measurements.

Results on Automated Anatomical Interpretation.

Since the membership of an ion to multiple anatomical structures cannot be clearly captured by a univariate strategy, the use of correlation to drive automated anatomical interpretation of ion images is limited. Instead, a more advanced approach, using multivariate models to account for multi-membership, is necessary. The Methods section introduces a linear model, capable of capturing the multi-membership aspect effectively, to tie ion image patterns to anatomical structure patterns. By applying convex optimization to this model and the given ion and anatomy patterns, it is possible to obtain an optimal anatomical explanation for each ion image. FIGS. 5A and 5B show the automated anatomical interpretation of several ion images from the lipid case study, using the method disclosed herein. Each ion image gets interpreted, automatically and without user-intervention, as an optimal combination of anatomical zones from the AMBA. The interpretation is optimal in the sense that it selects the combination of atlas patterns that gives the closest approximation of the measured ion image. If there are multiple combinations that come equally close, the combination with the least amount of anatomical structures (and, thus, the simplest explanation) is selected. In short, the automated anatomical interpretation method provides (i) the closest approximation of the measured ion image using atlas structures (FIGS. 5A and 5B, bottom, middle), and (ii) an overview of the contributing anatomical structures, specifying name, reference location, and contributing intensity or weight in the interpretation (FIGS. 5A and 5B, bottom, outer ring). This visualization delivers quick insight into the major anatomical zones associated with an ion image, while also providing a notion of the relative contributions of each underlying structure involved.

The example in FIG. 5A shows a clearly defined expression of the ion m/z 742.57 in the fiber tracts and ventricles (more specifically the corpus callosum, which is not annotated as a separate region in the AMBA), the pallidum, and the somatosensory areas. Using negative contribution coefficients, the algorithm also reports areas where the ion exhibits reduced presence, such as in the striatum. FIG. 5B shows the ion m/z 723.53, which is specifically absent from the somatosensory areas. The strong congruence between empirically observed patterns in the ion distributions and anatomical structures extracted from the atlas, indicate good spatial mapping between these data sources, and strong biological signals in the IMS measurements. Additional examples of the in total 1405 ion images that the automated anatomical interpretation methodology were applied are provided in this application.

It should be noted that the heads-up-display type visualization of FIGS. 5A and 5B is meant for human consumption, and is but one of many possible representations of the interpretation results. In essence, the interpretation algorithm provides for each ion image a set of contribution coefficients, one for each structure in the atlas. Each contribution coefficient can be considered to report a degree of membership of an ion to a particular structure. Custom visualizations of these coefficients can be developed as demanded by the application. In the case of a machine-based follow-up, no visualization will be necessary at all and the anatomical membership coefficients for each ion image in an IMS experiment can be passed on directly to the next computational step in the analysis.

The automated breakdown of an ion image into contributing anatomical structures is a powerful tool, particularly for the histological non-expert. It supplies the researcher directly with the relationships between an ion and the anatomical structures in which it is expressed. The interpretation algorithm can substantially aid in unraveling the function of biomolecular ions. It can incorporate the body of pathological research that is currently publicly available into the analysis of an individual IMS experiment, and this without much additional effort. Essentially, the results of the analysis constitute a table of anatomical membership coefficients, linking each ion image to each anatomical structure. This table can be queried in the same way as the correlation table from the correlation-based queries, but does away with the disadvantages of a univariate approach. Most importantly, the multi-membership of ions to different anatomical zones is now taken into account, providing the user with a much more complete and reliable list of anatomical-structure-to-ion relationships.

The greatest benefit of an automated anatomical interpretation method is the potential for parallelization. A computational interpretation method can deliver anatomical interpretations for every ion image in an experiment, even if the number of ion images runs into the hundreds or thousands. It can provide these interpretations concurrently, without human intervention, and in a single calculation. This avoids the labor and time-intensive step of having a histological expert manually interpret hundreds of ion images, and the potential risk for human bias that comes with it. It also enables the researcher to pursue broad exploratory measurements, after which the focus can be narrowed to only the most promising ions that have demonstrated a relationship to a particular anatomical structure of interest.

A possible downside to using an anatomical atlas for the interpretation of IMS data is that zones that have not been previously discovered in pathological and anatomical research and thus are not present in the atlas, cannot be found in the ion images and cannot be part of their interpretation. However, examining those ions that cannot be adequately approximated with an atlas could provide a route to the automated discovery of new physiological or chemical sub-divisions within tissue areas that are considered to be homogeneous by anatomy. This is elaborated on in the Supplementary Information.

CONCLUSIONS

Establishing a link between an IMS experiment and an anatomical atlas can serve as an important accelerator, both for human and machine-guided exploration of IMS experiments.

As the number and complexity of IMS experiments increases, and studies aim to compare a growing number of IMS experiments to each other, the importance of automated approaches to filter the massive data sets for patterns of interest will become increasingly important. The automated anatomical interpretation of ion images can serve as a formidable catalyst for IMS analysis, due to its speed and ability to interpret thousands of ion images concurrently without human supervision.

On a less application-specific scale, a mapping between curated anatomy and IMS data can make a body of anatomical research available to any IMS-related computational method, to integrate into its analysis and improve its performance. In the case of multiple IMS experiments and multiple mappings to the same atlas, one can compare the anatomical interpretations of multiple experiments to each other by using a common reference (atlas) space. This would allow, for example, the automated detection of differences in activities of anatomical structures between healthy versus diseased tissues. Mapping multiple IMS data sets to a common reference coordinate system would also enable the creation of an IMS-based chemical reference atlas for lipidomics, proteomics, and metabolomics. In the specific case of the Allen Mouse Brain Atlas, this offers several promising perspectives for the future, since IMS-based data could then even be combined with non-IMS data sources, such as gene expression and neuron connectivity measurements, which are currently being linked to the Allen Mouse Brain Atlas by other research initiatives. The combination of these data sources can serve as a valuable multi-modal resource for systems biology research, bringing together insights from many different technologies and fields.

Two particular embodiments of this disclosure are, first, a method for automated interpretation of images in a computer-readable environment by 1) generating an image to interpret by a technique that images the spatial distribution of a particular property of a sample of a molecular or chemical composition, 2) linking a body of curated patterns or a set of reference image patterns to interpret the image, and 3) spatially mapping the body of curated patterns or the reference image patterns to the image to interpret, whereby the method is further characterized in that the method delivers a decomposition or approximation of the image pattern to interpret; and, second, a method for automated interpretation of images in a computer-readable environment by 1) generating an image to interpret by a technique that images the spatial distribution of a particular property species of a sample of a molecular or chemical composition, 2) linking a body of curated patterns or a set of reference image patterns with which to interpret the image, and 3) spatially mapping the body of curated patterns or the reference image patterns to the image to interpret, whereby the method is further characterized in that the method delivers a decomposition of the image to interpret into a combination of the body of curated patterns or reference image patterns and their corresponding expression intensities in the image to interpret. Yet another embodiment of this disclosure concerns a method according to the previous embodiments 1 and 2, whereby (i) the image to interpret is an image of spatial properties distribution throughout a section of the sample that images the spatial distribution of the molecules or chemicals by one or more of their properties; and (ii) the body of curated patterns or set of reference image patterns is a database of curated anatomical regions within the sample as defined in an anatomical atlas; and (iii) the common spatial basis is provided by a spatial mapping of coordinates from the anatomical atlas to the property image or vice versa, obtained through image registration. The properties in the image of spatial properties distribution can hereby be, for instance, physicochemical properties or molecular mass. Moreover, the spatial distribution of a particular property species is the spatial distribution of a composition of compounds, biomarker, metabolites, peptides or proteins. In a particular embodiment, this image is obtainable by an imaging technique that is imaging mass spectrometry (IMS). In fact, such image to interpret can be generated using a biomedical imaging technology such as Radiography, Magnetic Resonance Imaging (MM), Nuclear medicine, Ultrasound, Elastography, Tactile imaging, Photoacoustic imaging, Thermography, Tomography, Echocardiography, Raman spectroscopy, or Functional near-infrared spectroscopy or the image pattern to interpret can be generated using a microscope, for instance, a microscope of the group consisting of optical microscope, transmission electron microscope, scanning electron microscope and ultramicroscope or any of the types of scanning probe microscope. In a more particular embodiment, the property species is an ion species and the image is an ion image. In yet another particular embodiment, the image pattern to interpret is described as a vector $q \in \mathbb{R}^K$ with K the number of pixels or voxels in the image pattern to interpret. Hereby, pattern m in the body of curated patterns or set of reference image patterns can be represented by a vector $\phi^m \in \mathbb{R}^K$, whereby the total number of patterns in the body of curated patterns or set of reference image patterns is M and the vector q can be written/represented/decomposed as a combination of any of the M pattern vectors $\phi^m$. In yet another variant, the vector q is the weighted sum of the M pattern vectors $\phi^m$ as $q_k = \sum_{m=1}^{M} \phi_k^m p_m + \varepsilon_k$ for each k=1, ..., K where $p_m = (p_1, \ldots, p_M) \in \mathbb{R}^M$ represents the weights and the residual $\varepsilon = (\varepsilon_1, \ldots, \varepsilon_K)^T \in \mathbb{R}^K$. The weighted sum $\sum_{k=1}^{K} (\sum_{m=1}^{M} \phi_k^m p_m + \varepsilon_k)$ then represents a translation of the image pattern to interpret q as a sum of the body of curated patterns or reference image patterns. In yet another particular embodiment, the weights $p_m$ are determined through solution of an optimization problem, minimizing the residual $\varepsilon$ or the weights $p_m$ are determined through minimization of the residuals found through solution of an equation of the form $$p^* = \arg \min_p \sqrt{\sum_{k=1}^{K} \left( \sum_{m=1}^{M} \phi_k^m p_m - q_k \right)^2}$$

Or the weights $p_m$ are determined through minimization of the residuals found through solution of an equation of the form $$p_\gamma^* = \arg \min_p \left[ \sqrt{\sum_{k=1}^{K} \left( \sum_{m=1}^{M} \phi_k^m p_m - q_k \right)^2} + \gamma \sum_{m=1}^{M} |p_m| \right]$$

with $\gamma$ the tuning parameter and $|p_m|$ the 1-norm of $p_m$.

Or the weights $p_m$ are determined through minimization of the residuals found through solution of an equation of the form $$p_\gamma^* = \arg \min_p \left[ \sqrt{\sum_{k=1}^{K} \left( \sum_{m=1}^{M} \phi_k^m p_m - q_k \right)^2} + \gamma \sum_{m=1}^{M} |p_m| \right]$$

with $\gamma$ the tuning parameter and $|p_m|$ the 1-norm of $p_m$.

Hereby, the sparsity of the solution can be increased or decreased through tuning of the parameter $\gamma$, thus increasing or decreasing the number of body of curated patterns or reference image patterns included in the approximation.

In a more specific variant of the previous methods, the body of curated patterns or reference image patterns comprises curated biomedical patterns, whereby the body of curated patterns or reference image patterns are represented by ones where the pattern is present and zeros elsewhere; or the body of curated patterns or reference image patterns comprises anatomical regions defined in an atlas, whereby the body of curated patterns or reference image patterns are represented by ones where the pattern is present and zeros elsewhere; or the body of curated patterns or reference image patterns are represented by ones where the pattern is present and zeros elsewhere.

Yet other specific embodiments are any of the previous methods, whereby the body of curated patterns or reference image patterns and image pattern to interpret are mapped implicitly by the relative positions of the patterns in the reference image patterns or body of curated patterns and image pattern to interpret; or where the body of curated patterns or reference image patterns and the image pattern to interpret are mapped explicitly through registration to a common coordinate system; or where the body of curated patterns or reference image patterns and image pattern to interpret are mapped to each other through a neighboring tissue section; or where the body of curated patterns or reference image patterns and image pattern to interpret are mapped to each other through a non-rigid registration. Furthermore, this body of curated patterns or reference image patterns and image pattern to interpret can be mapped to each other using a free-form deformation model (FFD) that uses B-splines to calculate the mesh of control points. Furthermore, the squared correlation coefficient can be used to iteratively calculate the similarity between the target image I and the source image J formulated as $$E_{CC}(T) = \frac{\left( \sum_{n=1}^{N} (I_n - \bar{I})(J_n - \bar{J}^T) \right)^2}{\sum_{n=1}^{N} (I_n - \bar{I})^2 \sum_{n=1}^{N} (J_n - \bar{J}^T)^2}$$

where $\bar{I}$ is the intensity mean of image I and $\bar{J}$ is the intensity mean of image J.

Yet other embodiments, whereby any one of the image to interpret, body of curated patterns or reference image patterns, residuals or weights are represented as multidimensional arrays and the formulation of the model and and/or optimization formulation is adjusted accordingly. Yet another embodiment is an automated system for anatomical interpretation of ion distributions in tissue, the system comprising a device for generating an image to interpret by a technique that images the spatial distribution of a particular property species of a sample of a molecular or chemical composition and a computing unit comprising a data processor and a storage unit, the storage unit comprising at least one algorithm for use by the data processor for carrying out a method according to any one of the previously hereinabove described methods in a computer-readable environment. This system can comprise any of the following or a combination thereof: 1) at least one search interface to rapidly and exhaustively determine which images out of thousands seem to be involved with a certain pattern of interest and/or at least one means of bringing automatically into image analysis non-anatomical information or information that has been matched to the atlas.

Yet another embodiment is a list of annotations, for instance, an interpretation of the measured pattern in terms that are domain accepted, that reports the elements of the resultant model, namely the "provided patterns" or "PPs" and their respective weights, obtainable by a method according to any one of the previous methods mentioned hereinabove. In a specific embodiment, the system is used for comparison of different samples on the basis of anatomical annotations rather than spatial pattern matching.

Yet another embodiment is an annotations display or an annotations image, for instance, an interpretation of the measured pattern in terms that are domain accepted, that reports the elements of the resultant model, namely the "provided patterns" or "PPs" and their respective weights, obtainable by a method according to any one of the previous methods mentioned hereinabove.

Yet another embodiment is an encoded digital image that combines the elements of the resultant model, namely the PPs and their respective weights, to represent IPTI, e.g., the imaging mass spectrometry data and microscopic image data obtainable according to any one of the previous methods mentioned hereinabove.

Yet another embodiment is a computer-implemented medical diagnosing based on the method according to any one of the previous methods mentioned hereinabove.

Yet another embodiment is a computer program embodied on a computer-executable medium and configured to be executed by a processor to process image interpretation according to any one of the previous methods mentioned hereinabove.

Yet another embodiment is a computer-readable non-transitory storage medium that stores a program that causes a processor to execute image processing according to any one of the previous methods mentioned hereinabove.

Particular and preferred aspects of the disclosure are set out in the accompanying independent and dependent claims. Features from the dependent claims may be combined with features of the independent claims and with features of other dependent claims as appropriate and not merely as explicitly set out in the claims.

Thus, the claims following the detailed description are hereby expressly incorporated into this detailed description, with each claim standing on its own as a separate embodiment of this invention.

What is claimed is:

1. A method for facilitating interpretation of image patterns indicative of spatial distribution of a property using curated image patterns, the method comprising:
    receiving an image pattern to interpret (IPTI) and a set of curated image patterns, wherein the IPTI and at least one curated image pattern of the set of curated image patterns have been spatially registered to a common set of spatial locations;
    defining a model structure of a relationship between the IPTI and at least one curated image pattern using the common set of spatial locations, wherein one or more models that correspond to the model structure comprise coefficients and parameters and each set of different model coefficients and parameters represents a different interpretation of the IPTI; and
    selecting a model of the one or more models that optimizes an objective function.

2. The method of claim 1, wherein the structure of the relationship between the IPTI and the at least one curated image pattern is one of non-linear and multivariate.

3. The method of claim 1, wherein the objective function comprises a definition and/or optimization constraints related to human understanding and analysis.

4. The method of claim 1, wherein the objective function comprises a definition and/or optimization constraints related to computer analysis or computational use.

5. The method of claim 1, further comprising generating a decomposition of the IPTI comprising the at least one curated image pattern.

6. The method of claim 1, further comprising scoring the one or more models based on the objective function.

7. The method of claim 1, wherein the set of curated image patterns comprise information indicative of regions of interest.

8. The method of claim 1, wherein the IPTI is acquired from a scan of an anatomical region and/or anatomical feature.

9. The method of claim 1, wherein the IPTI is acquired using one of mass spectrometry imaging, magnetic resonance imaging, an ion imaging source, an ambient-pressure ion source, a low-pressure ion source, a computed tomography, radiography, nuclear medicine, ultrasound, elastography, tactile imaging, photoacoustic imaging, thermography, tomography, echocardiography, and spectroscopy.

10. A device for facilitating interpretation of image patterns related to a property of interest using curated image patterns, the device comprising:
    a non-transitory storage medium having software instructions stored thereon; and
    a processor configured to receive an image pattern to interpret (IPTI) from an imaging device and to receive a set of curated image patterns that are spatially registered to a common set of spatial locations, wherein the processor is further configured to execute the software instructions to perform the steps of:
        defining a model structure of a relationship between the IPTI and the at least one curated image pattern using the common set of spatial locations, wherein one or more models that correspond to the model structure comprise coefficients and parameters and each set of different model coefficients and parameters represents a different interpretation of the IPTI; and
        selecting a model of the one or more models that optimizes an objective function.

11. The device of claim 10, wherein the imaging device is one of a mass spectrometer, an magnetic resonance imaging system, an ion imaging system, an ion imaging system having an ambient-pressure ion source, an ion imaging system having a low-pressure ion source, a computed tomography system, a radiography system, a nuclear medicine system, an ultrasound system, an elastography system, a tactile imaging system, a photoacoustic imaging system, a thermography imaging system, a tomography imaging system, an echocardiography imaging system, and a spectroscopy system.

12. The device of claim 10, wherein the set of curated patterns are one of a set of anatomical patterns, a set of areas defined by an anatomical atlas, a set of areas defined by the Allen Mouse Brain Atlas, and a set of biomedical patterns.

13. The device of claim 10, wherein the at least one curated pattern comprises ones in locations that are part of a region of interest and zeros in other regions than the region of interest.

14. The device of claim 13, wherein a Gaussian filter configured to eliminate crisp borders to soften binary assignments at edges of the region of interest of the at least one curated pattern.

15. The device of claim 10, wherein the common set of spatial locations are stored in an image registration, spatial transformation, or a spatial transformation matrix.

16. The device of claim 10, wherein spatially registering the IPTI and at least one curated image pattern comprises one or more of: a manual image registration, an automated image registration, a rigid or affine registration, and a non-rigid registration.

17. The device of claim 10, wherein the IPTI is a microscopic image or a micrograph acquired from one or more of optical microscopy, transmission electron microscopy, scanning electron microscopy, ultramicroscopy, scanning probe microscopy, fluorescence microscopy, differential interference contrast microscopy, phase contrast microscopy, and tag-based microscopy.

18. The device of claim 10, wherein the IPTI is one of an ion image, an ion distribution image, a MALDI-based ion image, a SIMS-based ion image, a LA-ICP-based ion image, and a LAESI-based ion image.

19. The device of claim 10, wherein the processor is further configured to execute the software instructions and perform the step of generating a decomposition of the IPTI comprising the at least one curated image pattern.

20. A system for interpreting images, the system comprising:
    an imaging device configured to generate an image pattern to interpret (IPTI) indicative of a spatial distribution of a property;

a processor configured to:
  receive an image pattern to interpret (IPTI) and a set of curated image patterns, wherein the IPTI and at least one curated image pattern of the set of curated image patterns have been spatially registered to a common set of spatial locations;
  define a model structure of a relationship between the IPTI and the at least one curated image pattern using the common set of spatial locations, wherein one or more models that correspond to the model structure comprise coefficients and parameters and each set of different model coefficients and parameters represents a different interpretation of the IPTI; and
  select a model of the one or more models that optimizes an objective function.

* * * * *